United States Patent
Trenor et al.

(10) Patent No.: US 10,590,270 B2
(45) Date of Patent: Mar. 17, 2020

(54) METHOD FOR MAKING HETEROPHASIC POLYMER COMPOSITIONS

(71) Applicant: Milliken & Company, Spartanburg, SC (US)

(72) Inventors: Scott R. Trenor, Greenville, SC (US); Jason D. Sprinkle, Woodruff, SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 15/875,237

(22) Filed: Jan. 19, 2018

(65) Prior Publication Data
US 2018/0237625 A1    Aug. 23, 2018

Related U.S. Application Data

(60) Provisional application No. 62/461,600, filed on Feb. 21, 2017.

(51) Int. Cl.
| | | |
|---|---|---|
| *C08L 23/14* | (2006.01) | |
| *C08L 23/36* | (2006.01) | |
| *C08L 23/26* | (2006.01) | |
| *C08J 3/22* | (2006.01) | |

(52) U.S. Cl.
CPC .............. *C08L 23/36* (2013.01); *C08J 3/226* (2013.01); *C08L 23/14* (2013.01); *C08L 23/26* (2013.01); *C08J 2323/26* (2013.01); *C08J 2323/36* (2013.01); *C08J 2423/26* (2013.01); *C08J 2423/36* (2013.01); *C08L 2205/02* (2013.01); *C08L 2205/08* (2013.01); *C08L 2207/02* (2013.01); *C08L 2207/20* (2013.01); *C08L 2310/00* (2013.01)

(58) Field of Classification Search
CPC .......... C08L 23/14; C08L 23/26; C08L 23/36; C08L 23/08; C08L 23/10; C08L 2205/02; C08L 2205/08; C08L 2310/00; C08L 2207/02; C08L 2207/20; C08J 3/226; C08J 2423/26; C08J 2323/36; C08J 2323/26; C08J 2423/36; C08K 5/01; C08K 5/3432; C08K 5/315; C08K 5/103
See application file for complete search history.

(56) References Cited

U.S. PATENT DOCUMENTS

| | | | |
|---|---|---|---|
| 5,639,822 A | 6/1997 | Hungenberg et al. | |
| 7,649,052 B2 | 1/2010 | Massari et al. | |
| 8,207,272 B2 | 6/2012 | Bernreitner et al. | |
| 10,100,187 B2 * | 10/2018 | Peterson et al. | C08K 5/14 |
| 2015/0259453 A1 * | 9/2015 | Peterson et al. | C08L 23/10 525/375 |
| 2016/0024289 A1 | 1/2016 | Peterson et al. | |
| 2016/0145426 A1 | 5/2016 | Peterson et al. | |
| 2016/0229986 A1 | 8/2016 | Peterson et al. | |
| 2016/0257810 A1 | 9/2016 | Peterson et al. | |
| 2017/0073511 A1 | 3/2017 | Peterson et al. | |

FOREIGN PATENT DOCUMENTS

| | | |
|---|---|---|
| EP | 1 391 482 B1 | 5/2009 |
| WO | WO 2007/071494 A1 | 6/2007 |
| WO | WO 2015/138305 A1 | 9/2015 |
| WO | WO 2015/169690 A1 | 11/2015 |

OTHER PUBLICATIONS

PCT/US2018/014376 International Search Report, filed Jan. 19, 2018, 5 pages.
PCT/US2018/014376 Written Opinion of the International Searching Authority, filed Jan. 19, 2018, 9 pages.

* cited by examiner

*Primary Examiner* — Nathan M Nutter
(74) *Attorney, Agent, or Firm* — Robert M. Lanning

(57) ABSTRACT

A method for producing a polymer composition comprises the steps of providing a compatibilizing agent, providing a heterophasic polymer composition, providing a second polymer composition comprising recycled polymer; mixing the compatibilizing agent, the heterophasic polymer composition, and the second polymer composition, and generating free radicals in the heterophasic polymer composition and the second polymer composition. At least a portion of the compatibilizing agent is believed to react with the free radicals generated in the heterophasic polymer composition and the second polymer composition.

14 Claims, No Drawings

METHOD FOR MAKING HETEROPHASIC POLYMER COMPOSITIONS

CROSS REFERENCE TO RELATED APPLICATIONS

Pursuant to 35 U.S.C. § 119(e), this application claims priority to, and the benefit of the filing date of, U.S. Patent Application No. 62/461,600 filed on Feb. 21, 2017, the entire contents of which are incorporated herein by reference.

TECHNICAL FIELD OF THE INVENTION

The present invention is directed to polymer compositions that contain recycled polymer and have a desirable combination of high melt flow rate and high impact strength. The present invention is also directed to methods for making such compositions. Of particular interest are modified polypropylene impact copolymers.

BACKGROUND

Thermoplastics polymers have become ubiquitous in everyday life. For example, thermoplastic polymers are used in a variety of durable goods (e.g., home appliances, consumer electronics, furniture, and automobiles), consumable goods, and packaging materials for such goods. The ubiquity of thermoplastic polymers combined with an increase in recycling rates has enabled resin producers to introduce resin grades containing a significant amount of recycled material, such as post-consumer recycled (PCR) material (e.g., 25-50% PCR content). While these recycled resins are beneficial from a sustainability standpoint, the resins frequently exhibit diminished physical properties relative to 100% virgin resins. For example, the recycled resins typically exhibit lower impact strength and stiffness. Further, many recycled resins typically exhibit a relatively low melt flow rate (MFR), which can necessitate the use of a peroxide to increase the MFR into a desirable range for processing. However, increasing the MFR with a peroxide typically leads to further reductions in the impact resistance and stiffness of the recycled resin. Accordingly, when extant technologies are used in conjunction with recycled resins, one must strike a compromise between increasing the PCR content and undesirably decreasing the impact resistance and stiffness of the resulting polymer composition.

A need therefore remains for additives and processes that can produce polymer compositions having high recycled polymer content while maintaining, or even improving, the impact resistance of the polymer composition relative to compositions having lower recycled polymer content.

BRIEF SUMMARY OF THE INVENTION

In a first embodiment, the invention provides a method for producing a polymer composition, the method comprising the steps of:
(a) providing a compatibilizing agent, the compatibilizing agent comprising two or more functional groups capable of reacting with a free radical in a radical addition reaction;
(b) providing a heterophasic polymer composition, the heterophasic polymer composition comprising a propylene polymer phase and an ethylene polymer phase;
(c) providing a second polymer composition, the second polymer composition comprising recycled polymer;
(d) mixing the compatibilizing agent, the heterophasic polymer composition, and the second polymer composition; and
(e) generating free radicals in the propylene polymer phase and the ethylene polymer phase of the heterophasic polymer composition and in the polymer of the second polymer composition, whereby at least a portion of the compatibilizing agent reacts with the free radicals.

DETAILED DESCRIPTION

The following definitions are provided to define several of the terms used throughout this application.

As used herein, the term "recycled polymer" refers to post-consumer recycled polymer, post-industrial recycled polymer, and mixtures thereof.

As used herein, the term "post-consumer recycled" (PCR) refers to material (e.g., a polymer or polymers) that has reached the intended end user or consumer, is no longer being used for its intended purpose, and which has been collected or reclaimed after it is discarded by the end user or consumer. Thus, for example, it is understood that the term refers to material that would have otherwise been disposed of as waste, but has instead been collected and recovered (reclaimed) as a material input, in lieu of new virgin material, for a recycling or manufacturing process. The term is inclusive of such collected or reclaimed materials which have been further treated or processed to facilitate re-use of the material. Thus, for example, the term is inclusive of material that has been reprocessed from collected or reclaimed material by means of a manufacturing process and made into a product or into a component for incorporation into a product.

As used herein, the term "post-industrial recycled" (PIR) refers to material (e.g., a polymer or polymers) that has never reached the end user and has been collected or reclaimed from a waste stream produced in a manufacturing process. The term "post-industrial recycled" does not include materials that are generated in a manufacturing process and then are reused as a substitute for a raw material in the same manufacturing process, such as regrind polymer that is collected from the waste stream of a manufacturing process (e.g., a thermoforming process), ground to reduce its size, and then reused as a substituted for virgin polymer in the same manufacturing process (e.g., the same thermoforming process). The term is inclusive of such collected or reclaimed materials which have been further treated or processed to facilitate re-use of the material in another manufacturing process.

As used herein, the term "hydrocarbyl groups" refers to univalent functional groups derived from hydrocarbons by removal of a hydrogen atom from a carbon atom of the hydrocarbon.

As used herein, the term "substituted hydrocarbyl groups" refers to univalent functional groups derived from substituted hydrocarbons by removal of a hydrogen atom from a carbon atom of the substituted hydrocarbon. In this definition, the term "substituted hydrocarbon" refers to compounds derived from acyclic, monocyclic, and polycyclic, unbranched and branched hydrocarbons in which (1) one or more of the hydrogen atoms of the hydrocarbon is replaced with a non-hydrogen atom (e.g., a halogen atom) or a non-hydrocarbyl functional group (e.g., a hydroxy group or heteroaryl group) and/or (2) the carbon-carbon chain of the hydrocarbon is interrupted by an oxygen atom (e.g., as in an ether), a nitrogen atom (e.g., as in an amine), or a sulfur atom (e.g., as in a sulfide).

As used herein, the term "substituted alkyl groups" refers to univalent functional groups derived from substituted alkanes by removal of a hydrogen atom from a carbon atom of the alkane. In this definition, the term "substituted alkanes" refers to compounds derived from acyclic unbranched and branched hydrocarbons in which (1) one or more of the hydrogen atoms of the hydrocarbon is replaced with a non-hydrogen atom (e.g., a halogen atom) or a non-alkyl functional group (e.g., a hydroxy group, aryl group, or heteroaryl group) and/or (2) the carbon-carbon chain of the hydrocarbon is interrupted by an oxygen atom (as in an ether), a nitrogen atom (as in an amine), or a sulfur atom (as in a sulfide).

As used herein, the term "substituted cycloalkyl groups" refers to univalent functional groups derived from substituted cycloalkanes by removal of a hydrogen atom from a carbon atom of the cycloalkane. In this definition, the term "substituted cycloalkanes" refers to compounds derived from saturated monocyclic and polycyclic hydrocarbons (with or without side chains) in which (1) one or more of the hydrogen atoms of the hydrocarbon is replaced with a non-hydrogen atom (e.g., a halogen atom) or a non-alkyl functional group (e.g., a hydroxy group, aryl group, or heteroaryl group) and/or (2) the carbon-carbon chain of the hydrocarbon is interrupted by an oxygen atom, a nitrogen atom, or a sulfur atom.

As used herein, the term "alkenyl groups" refers to univalent functional groups derived from acyclic, unbranched and branched olefins (i.e., hydrocarbons having one or more carbon-carbon double bonds) by removal of a hydrogen atom from a carbon atom of the olefin.

As used herein, the term "substituted alkenyl groups" refers to univalent functional groups derived from acyclic, substituted olefins by removal of a hydrogen atom from a carbon atom of the olefin. In this definition, the term "substituted olefins" refers to compounds derived from acyclic, unbranched and branched hydrocarbons having one or more carbon-carbon double bonds in which (1) one or more of the hydrogen atoms of the hydrocarbon is replaced with a non-hydrogen atom (e.g., a halogen atom) or a non-alkyl functional group (e.g., hydroxy group, aryl group, heteroaryl group) and/or (2) the carbon-carbon chain of the hydrocarbon is interrupted by an oxygen atom (as in an ether) or a sulfur atom (as in a sulfide).

As used herein, the term "substituted cycloalkenyl groups" refers to univalent functional groups derived from substituted cycloalkenes by removal of a hydrogen atom from a carbon atom of the cycloalkene. In this definition, the term "substituted cycloalkenes" refers to compounds derived from monocyclic and polycyclic olefins (i.e., hydrocarbons having one or more carbon-carbon double bonds) in which one or more of the hydrogen atoms of the olefin is replaced with a non-hydrogen atom (e.g., a halogen atom) or a non-alkyl functional group (e.g., a hydroxy group, aryl group, or heteroaryl group).

As used herein, the term "substituted aryl groups" refers to univalent functional groups derived from substituted arenes by removal of a hydrogen atom from a ring carbon atom. In this definition, the term "substituted arenes" refers to compounds derived from monocyclic and polycyclic aromatic hydrocarbons in which one or more of the hydrogen atoms of the hydrocarbon is replaced with a non-hydrogen atom (e.g., a halogen atom) or a non-alkyl functional group (e.g., a hydroxy group).

As used herein, the term "substituted heteroaryl groups" refers to univalent functional groups derived from substituted heteroarenes by removal of a hydrogen atom from a ring atom. In this definition, the term "substituted heteroarenes" refers to compounds derived from monocyclic and polycyclic aromatic hydrocarbons in which (1) one or more of the hydrogen atoms of the hydrocarbon is replaced with a non-hydrogen atom (e.g., a halogen atom) or a non-alkyl functional group (e.g., a hydroxy group) and (2) at least one methine group (—C═) of the hydrocarbon is replaced by a trivalent heteroatom and/or at least one vinylidene group (—CH═CH—) of the hydrocarbon is replaced by a divalent heteroatom.

As used herein, the term "alkanediyl groups" refers to divalent functional groups derived from alkanes by removal of two hydrogen atoms from the alkane. These hydrogen atoms can be removed from the same carbon atom on the alkane (as in ethane-1,1-diyl) or from different carbon atoms (as in ethane-1,2-diyl).

As used herein, the term "substituted alkanediyl groups" refers to divalent functional groups derived from substituted alkanes by removal of two hydrogen atoms from the alkane. These hydrogen atoms can be removed from the same carbon atom on the substituted alkane (as in 2-fluoroethane-1,1-diyl) or from different carbon atoms (as in 1-fluoroethane-1,2-diyl). In this definition, the term "substituted alkanes" has the same meaning as set forth above in the definition of substituted alkyl groups.

As used herein, the term "cycloalkanediyl groups" refers to divalent functional groups derived from cycloalkanes (monocyclic and polycyclic) by removal of two hydrogen atoms from the cycloalkane. These hydrogen atoms can be removed from the same carbon atom on the cycloalkane or from different carbon atoms.

As used herein, the term "substituted cycloalkanediyl groups" refers to divalent functional groups derived from substituted cycloalkanes by removal of two hydrogen atoms from the cycloalkane. In this definition, the term "substituted cycloalkanes" has the same meaning as set forth above in the definition of substituted cycloalkyl groups.

As used herein, the term "cycloalkenediyl groups" refers to divalent functional groups derived from cycloalkenes (monocyclic and polycyclic) by removal of two hydrogen atoms from the cycloalkene. These hydrogen atoms can be removed from the same carbon atom on the cycloalkene or from different carbon atoms.

As used herein, the term "substituted cycloalkenediyl groups" refers to divalent functional groups derived from substituted cycloalkenes by removal of two hydrogen atoms from the cycloalkene. These hydrogen atoms can be removed from the same carbon atom on the cycloalkene or from different carbon atoms. In this definition, the term "substituted cycloalkenes" has the same meaning as set forth above in the definition of substituted cycloalkene groups.

As used herein, the term "arenediyl groups" refers to divalent functional groups derived from arenes (monocyclic and polycyclic aromatic hydrocarbons) by removal of two hydrogen atoms from ring carbon atoms.

As used herein, the term "substituted arenediyl groups" refers to divalent functional groups derived from substituted arenes by removal of two hydrogen atoms from ring carbon atoms. In this definition, the term "substituted arenes" refers to compounds derived from monocyclic and polycyclic aromatic hydrocarbons in which one or more of the hydrogen atoms of the hydrocarbon is replaced with a non-hydrogen atom (e.g., a halogen atom) or a non-alkyl functional group (e.g., a hydroxy group).

As used herein, the term "heteroarenediyl groups" refers to divalent functional groups derived from heteroarenes by removal of two hydrogen atoms from ring atoms. In this definition, the term "heteroarenes" refers to compounds derived from monocyclic and polycyclic aromatic hydrocarbons in which at least one methine group (—C═) of the hydrocarbon is replaced by a trivalent heteroatom and/or at least one vinylidene group (—CH═CH—) of the hydrocarbon is replaced by a divalent heteroatom.

As used herein, the term "substituted heteroarenediyl groups" refers to divalent functional groups derived from substituted heteroarenes by removal of two hydrogen atoms from ring atoms. In this definition, the term "substituted heteroarenes" has the same meaning as set forth above in the definition of substituted heteroaryl groups.

Unless otherwise indicated, conditions are 25° C., 1 atmosphere of pressure and 50% relative humidity, concentrations are by weight, and molecular weight is based on weight average molecular weight. The term "polymer" as used in the present application denotes a material having a weight average molecular weight ($M_w$) of at least 5,000. The term "copolymer" is used in its broad sense to include polymers containing two or more different monomer units, such as terpolymers, and unless otherwise indicated, includes random, block, and statistical copolymers. The concentration of ethylene or propylene in a particular phase or in the heterophasic composition is based on the weight of reacted ethylene units or propylene units relative to the total weight of polyolefin polymer in the phase or heterophasic composition, respectively, excluding any fillers or other non-polyolefin additives. The concentration of each phase in the overall heterogeneous polymer composition is based on the total weight of polyolefin polymers in the heterophasic composition, excluding any fillers or other non-polyolefin additives or polymers. In the structures of functional groups set forth below, the truncated bonds (i.e., the bonds truncated by the wavy lines) represent bonds to other portions of the compound containing the illustrated group.

In a first embodiment, the invention provides a method for producing a polymer composition. The method comprising the steps of (a) providing a compatibilizing agent, (b) providing a heterophasic polymer composition, (c) providing a second polymer composition, (d) mixing the compatibilizing agent, the heterophasic polymer composition, and the second polymer composition, and (e) generating free radicals in the heterophasic polymer composition and in the polymer of the second polymer composition. The compatibilizing agent preferably comprises two or more functional groups capable of reacting with a free radical in a radical addition reaction. The heterophasic polymer composition preferably comprises a propylene polymer phase and an ethylene polymer phase. The second polymer composition preferably comprises recycled polymer.

The compatibilizing agent preferably is an organic or organometallic compound comprising two or more functional groups capable of reacting with a free radical in a radical addition reaction (each such functional group can be hereinafter referred to as a "reactive functional group"). Suitable reactive functional groups for the compatibilizing agent include, but are not limited to, groups containing carbon-carbon multiple bonds (e.g., cyclic and acyclic carbon-carbon double bonds and carbon-carbon triple bonds), nitroxide radicals (including functional groups or moieties that form nitroxide radicals in situ during processing of the polymer), nitrones, and groups containing at least one tertiary carbon-hydrogen bond (e.g., a one tertiary carbon-hydrogen bond having a bond-dissociation energy of about 380 kJ/mol or less). Suitable examples of groups containing carbon-carbon multiple bonds include, but are not limited, vinyl groups, allyl groups, acrylate groups, and methacrylate groups. The compatibilizing agent can contain two or more of the same reactive functional group or more than one type of reactive functional group can be present on the compatibilizing agent. Suitable examples of compatibilizing agents include, but are not limited to, butadiene, butadiene oligomers, isoprene, isoprene oligomers, and mixtures thereof.

In one preferred embodiment, the compatibilizing agent comprises a nitroxide radical or a functional group or moiety that forms a nitroxide radical during processing of the polymer. Examples of nitroxide compounds that can be used as the compatibilizing agent in the present invention can be found in *Synthetic Chemistry of Stable Nitroxides*, L. B. Volodarsky et al. CRC Press, Inc. (1994). The nitroxide compound can be a 5- or 6-membered heterocyclic compound, which can incorporate the nitroxide nitrogen in the ring structure. For example, the compatibilizing agent can be based on 2,2,6,6-tetramethyl-1-piperidinyloxy (TEMPO), such as the compounds of Formula (AI)-(AVII) below:

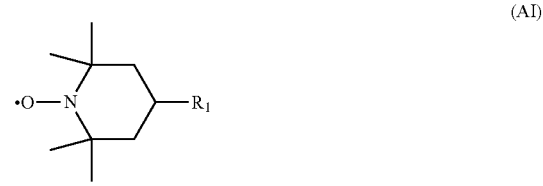

(AI)

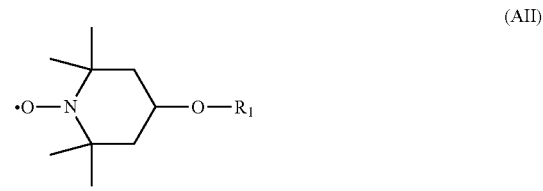

(AII)

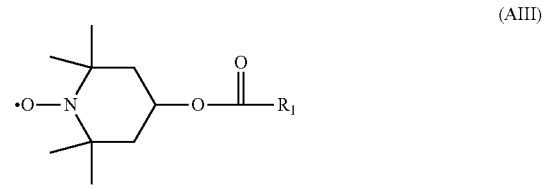

(AIII)

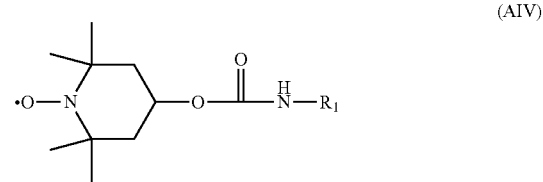

(AIV)

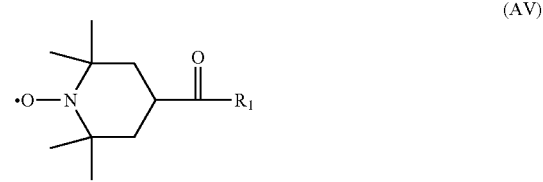

(AV)

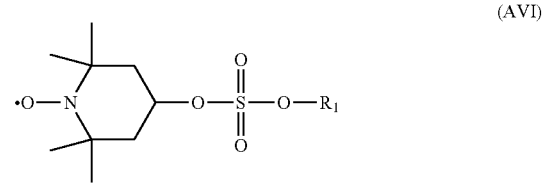

(AVI)

-continued

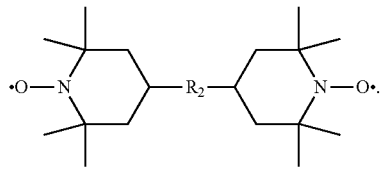
(AVII)

In the structures of Formulae (AI)-(AVI), $R_1$ is a functional group capable of reacting with a free radical in a radical addition reaction. Preferably, $R_1$ comprises an unsaturated carbon-carbon bond, such as a carbon-carbon double bond or a carbon-carbon triple bond. Suitable examples include but are not limited to aliphatic alkenyl groups and alkenyl substituted aromatic groups, such as phenyl. In another preferred embodiment, the alkenyl group is selected from the group consisting of $C_1$-$C_{10}$ alkenyl groups, more preferably $C_1$-$C_8$ alkenyl groups, $C_1$-$C_6$ alkenyl groups, or $C_1$-$C_4$ alkenyl groups. Specific examples of compounds conforming to one of Formulae (AI)-(AVI) and suitable for use as the compatibilizing agent include, but are not limited to, 4-(Methacryloyloxy)-2,2,6,6-tetramethylpiperidine-1-oxyl, ("TEMPO-Methacrylate"), 4-(Acryloyloxy)-2,2,6,6-tetramethylpiperidine-1-oxyl ("TEMPO-Acrylate"), and 4-[(4-vinylbenzyl)oxy]-2,2,6,6-tetramethyl piperidine-1-oxyl ("TEMPO-Styrene"). In the structure of Formula (AVII), $R_2$ is a divalent group linking the two TEMPO moieties. In one preferred embodiment, $R_2$ is a group of formula —O—$(CH_2CH_2O)_n$— where n is an integer equal to or greater than 1 (e.g., from 1 to 100). In a preferred embodiment, $R_2$ is a group conforming to the structure of Formula (AVIII) below

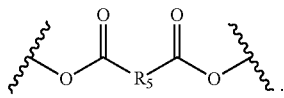
(AVIII)

In the structure of Formula (AVIII), $R_5$ is a divalent group selected from the group consisting of alkanediyl groups, substituted alkanediyl groups, cycloalkanediyl groups, substituted cycloalkanediyl groups, cycloalkenediyl groups, substituted cycloalkenediyl groups, arenediyl groups, and substituted arenediyl groups. Preferably, $R_5$ is selected from the group consisting of alkanediyl groups, cycloalkanediyl groups, and cycloalkenediyl groups. Specific examples of compounds conforming to the structure of Formula (AVII) and suitable for use as the compatibilizing agent include, but are not limited to, bis-(1-oxyl-2,2,6,6-tetramethylpiperidine-4-yl)sebacate and 4,4'-[bicyclo[2.2.1]hept-5-ene-2,3-diylbis(carbonyloxy)]bis(2,2,6,6-tetramethyl-1-piperidinyloxy).

As noted above, suitable reactive functional groups for the compatibilizing agent include carbon-carbon multiple bonds, preferably carbon-carbon double bonds. Thus, in another preferred embodiment, the compatibilizing agent is a compound comprising two or more carbon-carbon double bonds, preferably two or more acyclic carbon-carbon double bonds. Examples of compatibilizing agents incorporating multiple acyclic carbon-carbon double bonds include, but are not limited to, divinyl compounds (e.g., divinylbenzene), multifunctional acrylates, and acrylate salts of multivalent ions. General structures for such compatibilizing agents are set forth below. For example, the structure of Formula (AIX) depicts the general structure for suitable divinyl compounds

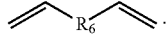
(AIX)

In the structure of Formula (AIX), $R_6$ is a divalent group selected from the group consisting of alkanediyl groups, substituted alkanediyl groups, cycloalkanediyl groups, substituted cycloalkanediyl groups, cycloalkenediyl groups, substituted cycloalkenediyl groups, arenediyl groups, substituted arenediyl groups, heteroarenediyl groups, and substituted heteroarenediyl groups. In a preferred embodiment, $R_6$ is selected from the group consisting of arenediyl groups and substituted arenediyl groups, with phendiyl being particularly preferred. The structure of Formula (AX) depicts the general structure for a multifunctional acrylate, specifically a diacrylate

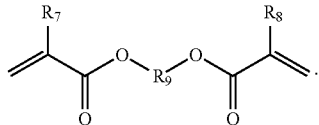
(AX)

In the structure of Formula (AX), $R_7$ and $R_8$ are independently selected from the group consisting of hydrogen and alkyl groups (e.g., methyl). $R_9$ is a divalent group selected from the group consisting of alkanediyl groups, substituted alkanediyl groups, cycloalkanediyl groups, substituted cycloalkanediyl groups, cycloalkenediyl groups, substituted cycloalkenediyl groups, arenediyl groups, substituted arenediyl groups, heteroarenediyl groups, and substituted heteroarenediyl groups. More preferably, $R_9$ is selected from the group consisting of alkanediyl groups, such as $C_1$-$C_8$ alkanediyl groups. One suitable example of such a diacrylate compound is butanediol dimethacrylate. The structure of Formula (AXI) depicts the general structure for acrylate salts suitable for use as the compatibilizing agent

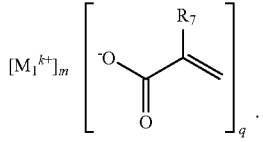
(AXI)

In the structure of Formula (AXI), $R_7$ is selected from the group consisting of hydrogen and alkyl groups (e.g., methyl). $M_1$ is a metal cation, and the variable k is the valence of the metal cation $M_1$ and is a positive integer equal to or greater than 2. The variable m is a positive integer equal to or greater than 1 and represents the number of metal cations $M_1$. The variable q is a positive integer equal to or greater than 2. The variables k, m, and q satisfy the following equation $k \cdot m = q$. In a preferred embodiment, $M_1$ is selected from the group consisting of alkaline earth metals and transition metals (i.e., those elements classified in the d-block and f-block of the periodic table of elements). One example of an acrylate salt suitable for use as the compatibilizing agent is zinc dimethacrylate.

In another preferred embodiment, the compatibilizing agent is selected from the group consisting of compounds conforming to the structure of Formula (BI)

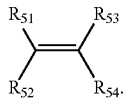
(BI)

In the structure of Formula (BI), $R_{51}$ is selected from the group consisting of aryl groups, substituted aryl groups, heteroaryl groups, substituted heteroaryl groups, and groups conforming to the structure of Formula (BV)

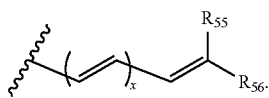
(BV)

In the structure of Formula (BV), $R_{55}$ and $R_{56}$ are independently selected from the group consisting of hydrogen, alkyl groups, substituted alkyl groups, cycloalkyl groups, substituted cycloalkyl groups, aryl groups, substituted aryl groups, heteroaryl groups, and substituted heteroaryl groups or $R_{55}$ and $R_{56}$ can be combined to form a cyclic structure. The variable x is an integer selected from the group consisting of 0, 1, and 2. In a preferred embodiment, the variable x is 0, $R_{55}$ is hydrogen, and $R_{56}$ is selected from the group consisting of aryl groups (e.g., $C_6$-$C_{12}$ aryl groups), substituted aryl groups (e.g., $C_6$-$C_{12}$ substituted aryl groups), heteroaryl groups (e.g., $C_4$-$C_{12}$ heteroaryl groups), and substituted heteroaryl groups (e.g., $C_4$-$C_{12}$ substituted heteroaryl groups).

In the structure of Formula (BI), $R_{52}$ is selected from the group consisting of hydrogen, halogens, alkyl groups, substituted alkyl groups, aryl groups, substituted aryl groups, heteroaryl groups, and substituted heteroaryl groups. If $R_{51}$ and $R_{52}$ are both aromatic groups, then (i) $R_{51}$ and $R_{52}$ are bridged by a direct bond, an alkanediyl group (e.g. a methanediyl group), an oxygen atom, a sulfur atom, or a nitrogen atom (e.g., a —N(H)— group), or (ii) at least one of $R_{51}$ and $R_{52}$ is selected from the group consisting of substituted aryl groups substituted with an electron withdrawing group, heteroaryl groups, and substituted heteroaryl groups.

In a preferred embodiment of the structure of Formula (BI), at least one of $R_{51}$ and $R_{52}$ is a group conforming to the structure of Formula (C), (CX), or (CXV)

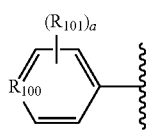
(C)

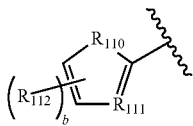
(CX)

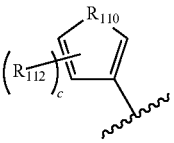
(CXV)

In the structure of Formula (C), $R_{100}$ is selected from the group consisting of C(H), C($R_{101}$), and a nitrogen atom. The variable a is an integer from 0 to 4. Each $R_{101}$ is independently selected from the group consisting of alkyl groups (e.g., $C_1$-$C_{10}$ alkyl groups), substituted alkyl groups (e.g., $C_1$-$C_{10}$ substituted alkyl groups), aryl groups (e.g., $C_6$-$C_{12}$ aryl groups), substituted aryl groups (e.g., $C_6$-$C_{12}$ substituted aryl groups), heteroaryl groups (e.g., $C_4$-$C_{12}$ heteroaryl groups), substituted heteroaryl groups (e.g., $C_4$-$C_{12}$ substituted heteroaryl groups), halogens, nitro groups, cyano groups, amine groups, hydroxy groups, alkoxy groups (e.g., $C_1$-$C_{10}$ alkoxy groups), aryloxy groups (e.g., $C_6$-$C_{12}$ aryloxy groups), alkenyl groups (e.g., $C_2$-$C_{10}$ alkenyl groups), alkynyl groups (e.g., $C_2$-$C_{10}$ alkynyl groups), alkyl ester groups (e.g., $C_1$-$C_{10}$ alkyl ester groups), and aryl ester groups (e.g., $C_6$-$C_{12}$ aryl ester groups). Further, two adjacent $R_{101}$ groups can be linked to form a fused ring structure, such as a polycyclic aryl group. In the structure of Formula (CX), $R_{110}$ is selected from the group consisting of an oxygen atom, a sulfur atom, and N($R_{115}$). $R_{115}$ is selected from the group consisting of hydrogen, alkyl groups (e.g., $C_1$-$C_{10}$ alkyl groups), substituted alkyl groups (e.g., $C_1$-$C_{10}$ substituted alkyl groups), aryl groups (e.g., $C_6$-$C_{12}$ aryl groups), and substituted aryl groups (e.g., $C_6$-$C_{12}$ substituted aryl groups). $R_{111}$ is selected from the group consisting of C(H), C($R_{112}$), and a nitrogen atom. $R_{112}$ is selected from the group consisting of alkyl groups (e.g., $C_1$-$C_{10}$ alkyl groups), substituted alkyl groups (e.g., $C_1$-$C_{10}$ substituted alkyl groups), aryl groups (e.g., $C_6$-$C_{12}$ aryl groups), substituted aryl groups (e.g., $C_6$-$C_{12}$ substituted aryl groups), heteroaryl groups (e.g., $C_4$-$C_{12}$ heteroaryl groups), substituted heteroaryl groups (e.g., $C_4$-$C_{12}$ substituted heteroaryl groups), halogens, nitro groups, cyano groups, amine groups, hydroxy groups, alkoxy groups (e.g., $C_1$-$C_{10}$ alkoxy groups), aryloxy groups (e.g., $C_6$-$C_{12}$ aryloxy groups), alkenyl groups (e.g., $C_1$-$C_{10}$ alkenyl groups), alkynyl groups (e.g., $C_2$-$C_{10}$ alkynyl groups), alkyl ester groups (e.g., $C_2$-$C_{10}$ alkyl ester groups), and aryl ester groups (e.g., $C_6$-$C_{12}$ aryl ester groups). Further, two adjacent $R_{112}$ groups can be linked to form a fused ring structure, such as a polycyclic aryl group. The variable b is an integer from 0 to 2. In the structure of Formula (CXV), $R_{110}$ and $R_{112}$ are selected from the same groups described above for Formula (CX), and the variable c is an integer from 0 to 3.

In the structure of Formula (BI), $R_{53}$ and $R_{54}$ are independently selected from the group consisting of hydrogen, alkyl groups, substituted alkyl groups, cycloalkyl groups, substituted cycloalkyl groups, cyano groups, nitro groups, and groups conforming to a structure of Formula (BVI), (BVII), (BVIII), or (BIX)

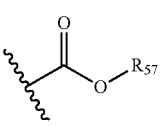
(BVI)

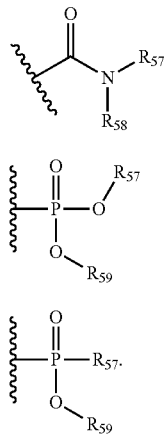
(BVII)

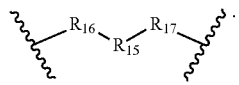
(BVIII)

(BIX)

In the structures of Formulae (BVI), (BVII), (BVIII), and (BIX), $R_{57}$ and $R_{59}$ are independently selected from the group consisting of alkyl groups (e.g., $C_1$-$C_{22}$ alkyl groups), substituted alkyl groups (e.g., $C_1$-$C_{22}$ substituted alkyl groups), cycloalkyl groups (e.g., $C_3$-$C_{22}$ cycloalkyl groups), substituted cycloalkyl groups (e.g., $C_3$-$C_{22}$ substituted cycloalkyl groups), aryl groups (e.g., $C_6$-$C_{22}$ aryl groups), substituted aryl groups (e.g., $C_6$-$C_{22}$ substituted aryl groups), heteroaryl groups (e.g., $C_4$-$C_{22}$ heteroaryl groups), and substituted heteroaryl groups (e.g., $C_4$-$C_{22}$ substituted heteroaryl groups). $R_{58}$ is selected from the group consisting of hydrogen, alkyl groups (e.g., $C_1$-$C_{22}$ alkyl groups), substituted alkyl groups (e.g., $C_1$-$C_{22}$ substituted alkyl groups), cycloalkyl groups (e.g., $C_3$-$C_{22}$ cycloalkyl groups), substituted cycloalkyl groups (e.g., $C_3$-$C_{22}$ substituted cycloalkyl groups), aryl groups (e.g., $C_6$-$C_{22}$ aryl groups), substituted aryl groups (e.g., $C_6$-$C_{22}$ substituted aryl groups), heteroaryl groups (e.g., $C_4$-$C_{22}$ heteroaryl groups), and substituted heteroaryl groups (e.g., $C_4$-$C_{22}$ substituted heteroaryl groups). For groups conforming to the structure of Formula (BVIII), $R_{57}$ and $R_{59}$ can be combined to form a cyclic structure. Lastly, in the structure of Formula (BI), at least one of $R_{53}$ and $R_{54}$ is selected from the group consisting of cyano groups, nitro groups, and groups conforming to a structure of Formula (BVI), (BVII), (BVIII), or (BIX). In a preferred embodiment, $R_{53}$ and $R_{54}$ are independently selected from the group consisting of hydrogen, cyano groups, nitro groups, and groups conforming to the structure of Formula (BVI), where $R_{57}$ is an alkyl group (e.g., a $C_1$-$C_{22}$ alkyl group).

In another preferred embodiment, the compatibilizing agent is selected from the group consisting of compounds conforming to the structure of Formula (BX)

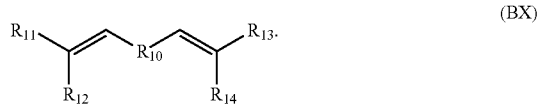
(BX)

In the structure of Formula (BX), $R_{10}$ is selected from the group consisting of arenediyl groups, substituted arenediyl groups, heteroarenediyl groups, substituted heteroarenediyl groups, and groups conforming to a structure of Formula (BXV)

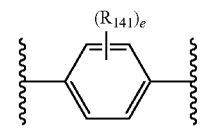
(BXV)

In the structure of Formula (BXV), $R_{15}$ is selected from the group consisting of a direct bond between $R_{16}$ and $R_{17}$, an oxygen atom, an alkanediyl group, and a substituted alkanediyl group. $R_{16}$ and $R_{17}$ are independently selected from the group consisting of arenediyl groups, substituted arenediyl groups, heteroarenediyl groups, and substituted heteroarenediyl groups. In a preferred embodiment, $R_{10}$ is a group conforming to a structure selected from the group consisting of Formulae (CXX) (CXXV), (CXXX), and (CXXXV)

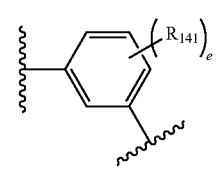
(CXX)

(CXXV)

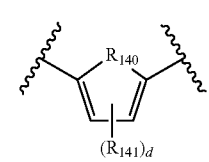
(CXXX)

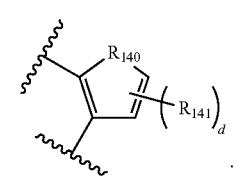
(CXXXV)

In the structures of Formulae (CXXX) and (CXXXV), $R_{140}$ is selected from the group consisting of an oxygen atom, a sulfur atom, —N(H)—, and —N($R_{145}$)—, where $R_{145}$ is selected from the group consisting of $C_1$-$C_{10}$ alkyl groups and $C_6$-$C_{12}$ aryl groups. In the structures of Formulae (CXX), (CXXV), (CXXX), and (CXXXV), each $R_{141}$ is selected from the group consisting of halogen atoms. The variable d is an integer from 0 to 2, and the variable e is an integer from 0 to 4. In another preferred embodiment, $R_{10}$ is a group conforming to the structure of Formula (BXV) in which $R_{15}$ is selected from a direct bond and an oxygen atom and $R_{16}$ and $R_{17}$ are groups conforming to the structure of Formula (CXX).

In the structure of Formula (BX), $R_{11}$, $R_{12}$, $R_{13}$, and $R_{14}$ are independently selected from the group consisting of hydrogen, alkyl groups, substituted alkyl groups, cycloalkyl groups, substituted cycloalkyl groups, cyano groups, nitro groups, and groups conforming to a structure of Formula (BVI), (BVII), (BVIII), or (BIX) as described above. In the structure of Formula (BX), at least one of $R_{11}$ and $R_{12}$ and at least one of $R_{13}$ and $R_{14}$ is selected from the group consisting of cyano groups, nitro groups, and groups conforming to a structure of Formula (BVI), (BVII), (BVIII), or (BIX).

In another preferred embodiment, the compatibilizing agent is selected from the group consisting of compounds conforming to the structure of Formula (BXX)

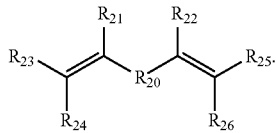
(BXX)

In the structure of Formula (BXX), $R_{20}$ is a divalent linking group. The divalent linking group can be any suitable divalent linking group. Suitable divalent linking groups include, but are not limited to, alkanediyl groups, substituted alkanediyl groups, cycloalkanediyl groups, substituted cycloalkanediyl groups, arenediyl groups, substituted arenediyl groups, heteroarenediyl groups, and substituted heteroarenediyl groups. In one preferred embodiment, $R_{20}$ is a group conforming to the structure of Formula (BXXV)

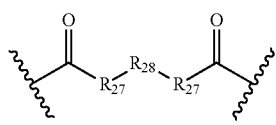
(BXXV)

In the structure of Formula (BXXV), $R_{27}$ is selected from the group consisting of an oxygen atom, —N(H)—, and —N($R_{29}$)—, where $R_{29}$ is selected from the group consisting of alkyl groups, substituted alkyl groups, cycloalkyl groups, and substituted cycloalkyl groups. $R_{28}$ is selected from the group consisting of alkanediyl groups and cycloalkanediyl groups. In a preferred embodiment, both $R_{27}$ are oxygen atoms and $R_{28}$ is an alkanediyl group (e.g., a $C_1$-$C_8$ alkanediyl group). In another preferred embodiment, $R_{20}$ is a group conforming to the structure of Formula (BXXX)

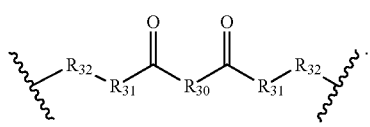
(BXXX)

In the structure of Formula (BXXX), $R_{30}$ is selected from the group consisting of alkanediyl groups and cycloalkanediyl groups. $R_{31}$ is selected from the group consisting of an oxygen atom, —N(H)—, and —N($R_{29}$)—, where $R_{29}$ is selected from the group consisting of alkyl groups, substituted alkyl groups, cycloalkyl groups, and substituted cycloalkyl groups. $R_{32}$ is selected from the group consisting of arenediyl groups, substituted arenediyl groups, heteroarenediyl groups, substituted heteroarenediyl groups, and —$R_{35}R_{36}$—, where $R_{35}$ is selected from the group consisting of arenediyl groups, substituted arenediyl groups, heteroarenediyl groups, and substituted heteroarenediyl groups, and $R_{36}$ is selected from the group consisting of alkanediyl groups (e.g., $C_1$-$C_4$ alkanediyl groups). In a preferred embodiment, $R_{30}$ is an alkanediyl group (e.g., a $C_1$-$C_8$ alkanediyl group), both $R_{31}$ are oxygen atoms, and both $R_{32}$ are selected from heteroarenediyl groups, substituted heteroarenediyl groups, and —$R_{35}R_{36}$—. More specifically, in such a preferred embodiment, $R_{32}$ preferably conforms to the structure of Formula (BXL)

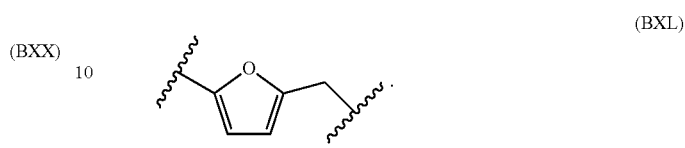
(BXL)

In the structure of Formula (BXX), $R_{21}$ and $R_{22}$ are selected from the group consisting of cyano groups, nitro groups, and groups conforming to a structure of Formula (BVI), (BVII), (BVIII), or (BIX) as described above. $R_{23}$, $R_{24}$, $R_{25}$, and $R_{26}$ are independently selected from the group consisting of hydrogen, alkyl groups, substituted alkyl groups, cycloalkyl groups, substituted cycloalkyl groups, aryl groups, substituted aryl groups, heteroaryl groups, substituted heteroaryl groups, and groups conforming to the structure of Formula (BV) as described above. In the structure of Formula (BXX), at least one of $R_{23}$ and $R_{24}$ and at least one of $R_{25}$ and $R_{26}$ is selected from the group consisting of aryl groups, substituted aryl groups, heteroaryl groups, substituted heteroaryl groups, and groups conforming to the structure of Formula (BV). Further, if $R_{23}$ and $R_{24}$ are both aromatic groups, then (i) $R_{23}$ and $R_{24}$ are bridged by a direct bond or an alkyl group or (ii) at least one of $R_{23}$ and $R_{24}$ is selected from the group consisting of substituted aryl groups substituted with an electron withdrawing group, heteroaryl groups, and substituted heteroaryl groups. And, if $R_{25}$ and $R_{26}$ are both aromatic groups, then (i) $R_{25}$ and $R_{26}$ are bridged by a direct bond or an alkyl group or (ii) at least one of $R_{25}$ and $R_{26}$ is selected from the group consisting of substituted aryl groups substituted with an electron withdrawing group, heteroaryl groups, and substituted heteroaryl groups.

In another preferred embodiment, the compatibilizing agent comprises (i) at least one tertiary carbon-hydrogen bond and (ii) at least one acyclic carbon-carbon double bond. The tertiary carbon-hydrogen bond in the compatibilizing agent preferably is relatively weak or labile, which is believed to allow the hydrogen atom to dissociate from the compatibilizing agent by homolysis and yield a radical form of the compatibilizing agent bearing an unpaired electron on the tertiary carbon atom. While not wishing to be bound to any particular theory, it is believed that the tertiary nature of this carbon atom results in a radical that exhibits sufficient stability to react with polymer radicals formed in the heterophasic polymer composition. The relative strength or lability of the tertiary carbon-hydrogen bond can be characterized by the bond-dissociation energy. The bond-dissociation energy of the tertiary carbon-hydrogen bond is the enthalpy (per mole) required to break the tertiary carbon-hydrogen bond by homolysis. The tertiary carbon-hydrogen bond in the compatibilizing agent can therefore have any bond-dissociation energy that is low enough for the compatibilizing agent to be stable under storage and yet form radicals in the heterophasic polymer composition as described above. Preferably, the tertiary carbon-hydrogen bond has a bond-dissociation energy of about 380 kJ/mol or less (about 90.8 kcal/mol or less) at 298 K. More preferably, the tertiary carbon-hydrogen bond has a bond-dissociation energy of about 377 kJ/mol or less (about 90 kcal/mol or less), about 375 KJ/mol or less (about 89.6 kcal/mol or less), about 355 kJ/mol or less (about 85 kcal/mol or less), about 345 kJ/mol or less (about 82.5 kcal/mol or less), about 343 kJ/mol or less (about 82 kcal/mol or less), about 341 kJ/mol or less (about 81.5 kcal/mol or less), about 339 kJ/mol or less (about 81 kcal/mol or less), about, or about 337 kJ/mol or less (about 80.5 kcal/mol or less). While not wishing to be bound to any particular theory, the inventors believe that an acceptable bond-dissociation energy for the tertiary carbon-hydrogen bond can depend, at least in part, on the number of acyclic carbon-carbon double bonds present in the compatibilizing agent. For example, if the compatibilizing agent comprises two or more acyclic carbon-carbon double bonds, the compatibilizing agent can exhibit satisfactory performance when the bond-dissociation energy of the tertiary carbon-hydrogen bond lies higher in the ranges listed above. On the other hand, if the compatibilizing agent comprises only one acyclic carbon-carbon double bond, the bond dissociation energy of the tertiary carbon-hydrogen bond preferably lies lower in the ranges listed above. For example, if the compatibilizing agent comprises only one acyclic carbon-carbon double bond, the bond dissociation energy of the tertiary carbon-hydrogen bond preferably is about 355 kJ/mol or less (about 85 kcal/mol or less), more preferably about 345 kJ/mol or less (about 82.5 kcal/mol or less), more preferably about 343 kJ/mol or less (about 82 kcal/mol or less), and most preferably about 341 kJ/mol or less (about 81.5 kcal/mol or less). All of the bond-dissociation energies listed above are for the homolytic cleavage of the tertiary carbon-hydrogen bond at a temperature of 298 K.

The bond-dissociation energy of the tertiary carbon-hydrogen bond can be determined by any suitable means. Given the difficulties inherent in directly measuring the bond-dissociation energy of the bonds within a molecule, the bond-dissociation energy typically is calculated from a molecular model of the compatibilizing agent using commercially available molecular modeling software. For example, the bond-dissociation energy can be computed using density functional theory with the B3LYP functional. The bond-dissociation energy of the tertiary carbon-hydrogen bond ($\Delta H°(C-H)$) in the molecule M is defined in Equation 1 below $$\Delta H°(C-H) = [H°(M \cdot) + H°(H \cdot)] - H°(M).$$  Equation 1:

In Equation 1, $H°(M)$, $H°(M \cdot)$ and $H°(H \cdot)$ are the absolute enthalpies at 298 K of the molecule M, M. radical and H. radical, respectively. The absolute enthalpies can be calculated, for example, with the Dmol3 program in the Materials Studio (version 8.0) software tool from Biovia. When using the Dmol3 program, the input parameters for the calculations are shown in Table A for molecule M and in Table B for radicals M. and H.. The value of $H°(H \cdot)$ is calculated at −0.496344 Hartrees (1 Hartree (Ha)=627.51 kcal/mol).

TABLE A

Input parameters for molecule M.

| Calculation parameters | |
|---|---|
| Opt_energy_convergence | 1.0000e−005 Ha |
| Opt_gradient_convergence | 2.0000e−003 Ha/A |
| Opt_displacement_convergence | 5.0000e−003 A |
| Opt_iterations | 500 |
| Opt_max_displacement | 0.3000 A |
| Initial_hessian | improved |
| Symmetry | off |
| Max_memory | 2048 |
| File_usage | smart |
| Scf_density_convergence | 1.000000e−006 |

TABLE A-continued

Input parameters for molecule M.

| | |
|---|---|
| Scf_charge_mixing | 2.000000e−001 |
| Scf_diis | 6 pulay |
| Scf_iterations | 50 |
| Electronic Parameters | |
| Spin_polarization | restricted |
| Charge | 0 |
| Basis set | dnp |
| Pseudopotential | none |
| Functional | B3LYP umesh = xcoarse minu = −3 |
| Aux_density | octupole |
| Integration_grid | fine |
| Occupation | thermal 0.0050 |
| Cutoff_Global | 3.7000 angstrom |

TABLE B

Input parameters for Radical M•.

| Calculation parameters | |
|---|---|
| Opt_energy_convergence | 1.0000e−005 Ha |
| Opt_gradient_convergence | 2.0000e−003 Ha/A |
| Opt_displacement_convergence | 5.0000e−003 A |
| Opt_iterations | 500 |
| Opt_max_displacement | 0.3000 A |
| Initial_hessian | improved |
| Symmetry | off |
| Max_memory | 2048 |
| File_usage | smart |
| Scf_density_convergence | 1.000000e−006 |
| Scf_charge_mixing | 2.000000e−001 |
| Scf_diis | 6 pulay |
| Scf_iterations | 300 |
| Electronic Parameters | |
| Spin_polarization | unrestricted |
| Charge | 0 |
| Basis set | dnp |
| Pseudopotential | none |
| Functional | B3LYP umesh = xcoarse minu = −3 |
| Aux_density | octupole |
| Integration_grid | fine |
| Occupation | thermal 0.0050 |
| Cutoff_Global | 3.7000 angstrom |

The bond-dissociation energies for the tertiary carbon-hydrogen bond in the compatibilizing agent preferably are calculated using the procedure described above.

As utilized in describing the compatibilizing agent, the term "acyclic carbon-carbon double bond" refers to a carbon-carbon double bond that is not contained within a cyclic system, such as an aromatic ring. Thus, for example, the carbon-carbon double bonds in the vinylidene groups (—CH═CH—) contained within a phenyl ring are not acyclic carbon-carbon double bonds. However, the carbon-carbon double bond contained within the vinyl group of the compound styrene (i.e., phenylethene) is an acyclic carbon-carbon double bond. Further, carbon-carbon double bonds that are pendant to a cyclic system (e.g., the carbon-carbon bond is formed between a first carbon atom that is part of a cyclic system and a second carbon atom that is not part of a cyclic system) are also acyclic carbon-carbon double bonds. In a preferred embodiment, the acyclic carbon-carbon double bond in the compatibilizing agent has at least two hydrogen atoms bonded to the carbon atoms in the acyclic carbon-carbon double bond. These hydrogen atoms can be bonded to the same carbon atom in the acyclic carbon-carbon double bond, such as in a vinyl group, or these hydrogen atoms can be bonded to each of the carbon atoms in the acyclic carbon-carbon double bond, such as in a 2-phenylethenyl group. In a preferred embodiment, the acyclic carbon-carbon double bond comprises two hydrogen atoms bonded to one of the carbon atoms in the acyclic carbon-carbon double bond.

In a preferred embodiment, the compatibilizing agent conforms to the structure of Formula (DI) below

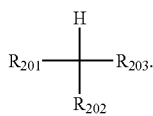
(DI)

In the structure of Formula (DI), $R_{201}$, $R_{202}$, and $R_{203}$ are independently selected from the group consisting of aryl groups, substituted aryl groups, heteroaryl groups, substituted heteroaryl groups, electron withdrawing groups, and groups conforming to the structure of Formula (DV), Formula (DVI), Formula (DVII), or Formula (DVIII) below. The structure of Formula (DV) is

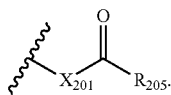
(DV)

In the structure of Formula (DV), $X_{201}$ is selected from the group consisting of oxygen and —N(H)— and $R_{205}$ is selected from the group consisting of alkenyl groups, substituted alkenyl groups, substituted aryl groups, and substituted heteroaryl groups, provided the substituted aryl groups and substituted heteroaryl groups comprise at least one alkenyl group or substituted alkenyl group. The structure of Formula (DVI) is

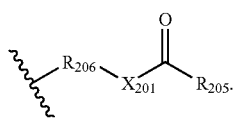
(DVI)

In the structure of Formula (DVI), $R_{206}$ is selected from the group consisting of alkanediyl groups and substituted alkanediyl groups, and $X_{201}$ and $R_{205}$ are selected from the groups set forth above for the structure of Formula (DV). The structure of Formula (DVII) is

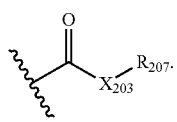
(DVII)

In the structure of Formula (DVII), $X_{203}$ is selected from the group consisting of oxygen, —N(H)—, and —N($R_7$)—. $R_{207}$ is selected from the group consisting of alkenyl groups, substituted alkenyl groups, substituted aryl groups, and substituted heteroaryl groups, provided the substituted aryl groups and substituted heteroaryl groups comprise at least one alkenyl group or substituted alkenyl group. The structure of Formula (DVIII) is

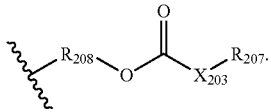
(DVIII)

In the structure of Formula (DVIII), $R_{208}$ is selected from the group consisting of alkanediyl groups, and $X_{203}$ and $R_{207}$ are selected from the groups set forth above for the structure of Formula (DVII). In the structure of Formula (DI), when two or more of $R_{201}$, $R_{202}$, and $R_{203}$ are aromatic groups, two of the groups can be fused by a linking element selected from the group consisting of a direct bond, an oxygen atom, and a sulfur atom. Further, in a preferred embodiment of the structure of Formula (DI), at least one of $R_{201}$, $R_{202}$, and $R_{203}$ is selected from the group consisting of aryl groups, substituted aryl groups, heteroaryl groups, and substituted heteroaryl groups. Lastly, at least one of $R_{201}$, $R_{202}$, and $R_{203}$ comprises at least one acyclic carbon-carbon double bond. In one particular embodiment of the structure of Formula (DI), $R_{201}$ is a cyano group, $R_{202}$ is a phenyl group, and $R_{203}$ is a 4-ethenylphenyl group.

In a more specific preferred embodiment, the compatibilizing agent conforms to the structure of Formula (DX) below

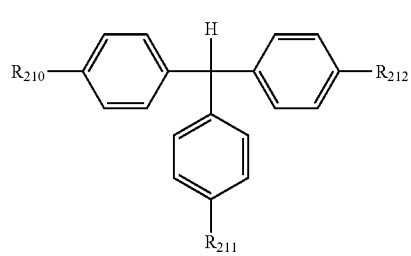
(DX)

In the structure of Formula (DX), $R_{210}$, $R_{211}$, and $R_{212}$ are independently selected from the group consisting of hydrogen, halogens, alkenyl groups, substituted alkenyl groups, groups conforming to the structure of Formula (DV) (as defined above in the description of the structure of Formula (DI)), and groups conforming to the structure —O—$R_{215}$, where $R_{215}$ is selected from the group consisting of alkenyl groups and substituted alkenyl groups. In the structure of Formula (DX), at least one of $R_{210}$, $R_{211}$, and $R_{212}$ comprises at least one acyclic carbon-carbon double bond.

In another preferred embodiment, the compatibilizing agent conforms to the structure of Formula (DXL) below

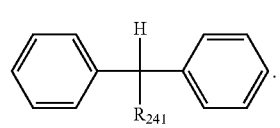
(DXL)

In the structure of Formula (DXL), $R_{241}$ is selected from the group consisting of groups conforming to the structure of Formula (DV) or Formula (DVII) (as defined above in the description of the structure of Formula (DI)). In one particular embodiment of the structure of Formula (DXL), $R_{241}$ is a group conforming to the structure of Formula (DVII), $X_{203}$ is —N(H)—, and $R_{207}$ is a substituted aryl group, preferably a 4-ethenylphenyl group. In another particular embodiment of the structure of Formula (DXL), $R_{241}$ is a group conforming to the structure of Formula (DV), $X_{201}$ is —N(H)—, and $R_{205}$ is a substituted alkenyl group, preferably a 2-phenylethenyl group.

In another preferred embodiment, the compatibilizing agent conforms to the structure of Formula (DL) below

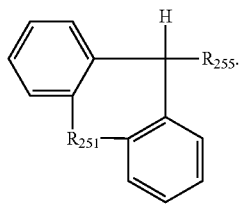

(DL)

In the structure of Formula (DL), $R_{251}$ is selected from the group consisting of a direct bond and oxygen, and $R_{255}$ is selected from the group consisting of substituted aryl groups, groups conforming to the structure of Formula (DV) (as defined above in the description of the structure of Formula (DI)), and groups conforming to the structure of Formula (DVI) (as defined above in the description of the structure of Formula (DI)). In a particular embodiment of the structure of Formula (DL), $R_{251}$ is a direct bond and $R_{255}$ is a 4-ethenylphenyl group. In another particular embodiment of the structure of Formula (DL), $R_{251}$ is an oxygen and $R_{255}$ is a 4-ethenylphenyl group. In another particular embodiment of the structure of Formula (DL), $R_{251}$ is a direct bond, $R_{255}$ is a group conforming to the structure of Formula (DV), $X_{201}$ is an oxygen, and $R_{205}$ is a 1-methylethenyl group. In another particular embodiment of the structure of Formula (DL), $R_{251}$ is a direct bond, $R_{255}$ is a group conforming to the structure of Formula (DVIII), $R_{208}$ is a methanediyl group, $X_{203}$ is —N(H)—, and $R_{207}$ is a 4-ethenylphenyl group.

In another preferred embodiment, the compatibilizing agent conforms to the structure of Formula (DXX) below

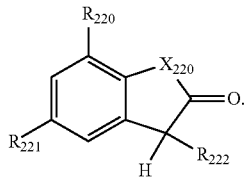

(DXX)

In the structure of Formula (DXX), $X_{220}$ is selected from the group consisting of an oxygen and —N(H)—, $R_{220}$ and $R_{221}$ are independently selected from the group consisting of hydrogen, $C_1$-$C_4$ alkyl groups, and groups conforming to the structure of Formula (DV) (as described above in connection with the structure of Formula (DI) above). $R_{222}$ is selected from the group consisting of aryl groups, substituted aryl groups, heteroaryl groups, and substituted heteroaryl groups. In the structure of Formula (DXX), at least one of $R_{220}$, $R_{221}$, and $R_{222}$ comprises at least one acyclic carbon-carbon double bond.

In another preferred embodiment, the compatibilizing agent conforms to the structure of Formula (DXXX) below

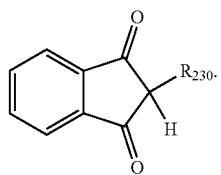

(DXXX)

In the structure of Formula (DXXX), $R_{230}$ is selected from the group consisting of substituted aryl groups and substituted heteroaryl groups, provided the substituted aryl groups and substituted heteroaryl groups comprise at least one alkenyl group or substituted alkenyl group.

In another preferred embodiment, the compatibilizing agent can be any organic compound comprising a fulvene moiety or a fulvene-derived moiety. The moiety can be unsubstituted or substituted, meaning that the hydrogens on the ring in the moiety and/or the terminal vinylic carbon atom can be replaced with non-hydrogen groups. Thus, in a preferred embodiment, the compatibilizing agent is selected from the group consisting of compounds comprising a moiety conforming to the structure of Formula (EI), compounds comprising a moiety conforming to the structure of Formula (EIII), and compounds conforming to the structure of Formula (EV)

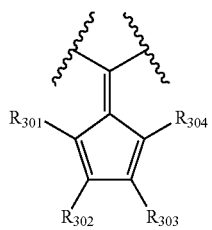

(EI)

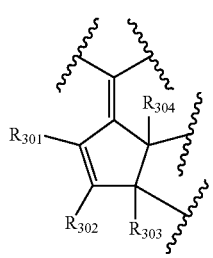

(EIII)

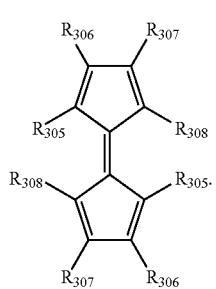

(EV)

In the structures of Formula (EI) and Formula (EIII), $R_{301}$, $R_{302}$, $R_{303}$, and $R_{304}$ are independently selected from the group consisting of hydrogen, halogens, hydrocarbyl groups, and substituted hydrocarbyl groups, provided adjacent hydrocarbyl groups or substituted hydrocarbyl groups can be combined to form a secondary ring fused to the ring of the moiety. Further, at least one of $R_{301}$, $R_{302}$, $R_{303}$, and $R_{304}$ is a hydrogen; preferably, at least two of $R_{301}$, $R_{302}$, $R_{303}$, and $R_{304}$ are hydrogens. The truncated bonds (i.e., the bonds truncated by the wavy lines) attached to the terminal vinylic carbon atom (in both Formula (EI) and Formula (EIII)) and the adjacent carbon atoms in the ring (in Formula (EIII)) represent bonds to other portions of the compatibilizing agent. In the structure of Formula (EV), $R_{305}$, $R_{306}$, $R_{307}$, and $R_{308}$ are independently selected from the group consisting of halogens.

In a preferred embodiment, $R_{301}$, $R_{302}$, $R_{303}$, and $R_{304}$ are independently selected from the group consisting of hydrogen, halogens, alkyl groups, substituted alkyl groups, aryl groups, substituted aryl groups, heteroaryl groups, and substituted heteroaryl groups. Suitable alkyl groups include, but are not limited to, linear and branched $C_1$-$C_{18}$ alkyl groups. Suitable substituted alkyl groups include, but are not limited to, linear and branched $C_1$-$C_{18}$ alkyl groups substituted with one or more non-hydrogen groups selected from the group consisting of halogens, hydroxy, aryl groups, substituted aryl groups, heteroaryl groups, and substituted heteroaryl groups. Suitable aryl groups include, but are not limited to, aryl groups such as phenyl and naphthyl. Suitable substituted aryl groups include, but are not limited to, monocyclic and polycyclic aryl groups substituted with one or more non-hydrogen groups selected from the group consisting of halogens, hydroxy, alkyl groups, and substituted alkyl groups. Suitable heteroaryl groups include, but are not limited to, furyl, thienyl, pyrrolyl, imidazolyl, pyrazolyl, oxazolyl, pyridinyl, pyrazinyl, pyrimidinyl and benzannulated analogs of such groups, such as benzimidazolyl. Suitable substituted heteroaryl groups include, but are not limited to, the heteroaryl groups described immediately above substituted with one or more non-hydrogen groups selected from the group consisting of halogens, hydroxy, alkyl groups, and substituted alkyl groups. In another preferred embodiment, $R_{301}$, $R_{302}$, $R_{303}$, and $R_{304}$ are each hydrogens.

In a more specific embodiment, the compatibilizing agent can be a compound conforming to the structure of Formula (EX) below

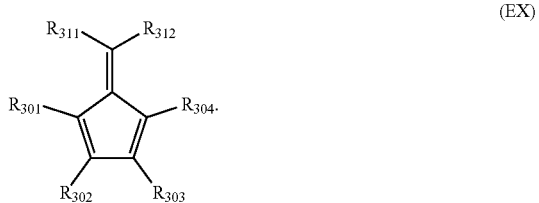

(EX)

In the structure of Formula (EX), $R_{301}$, $R_{302}$, $R_{303}$, and $R_{304}$ are independently selected from the groups recited above for the structure of Formula (EI), and $R_{311}$ and $R_{312}$ are individual substituents independently selected from the group consisting of hydrogen, alkyl groups, substituted alkyl groups, alkenyl groups, substituted alkenyl groups, amine groups, substituted amine groups, aryl groups, substituted aryl groups, heteroaryl groups, and substituted heteroaryl groups or $R_{311}$ and $R_{312}$ together form a single substituent selected from the group consisting of aryl groups, substituted aryl groups, heteroaryl groups, and substituted heteroaryl groups. Preferably, no more than one of $R_{311}$ and $R_{312}$ can be hydrogen.

In a preferred embodiment, $R_{311}$ and $R_{312}$ are independently groups conforming to a structure selected from the group consisting of Formula (F), Formula (FX), and Formula (FXV)

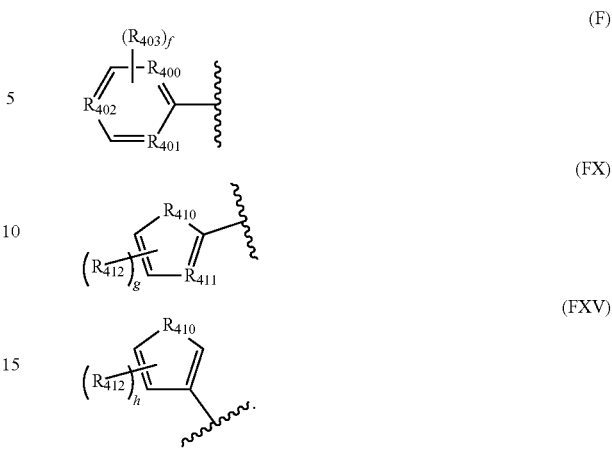

In the structure of Formula (F), $R_{400}$, $R_{401}$, and $R_{402}$ are independently selected from the group consisting of C(H), C($R_{401}$), and a nitrogen atom. The variable f is an integer from 0 to 4, but does not exceed a value equal to 5-z, where z is the number of nitrogen atoms in the ring. Each $R_{401}$ is independently selected from the group consisting alkyl groups (e.g., $C_1$-$C_{10}$ alkyl groups), substituted alkyl groups (e.g., $C_1$-$C_{10}$ substituted alkyl groups), aryl groups (e.g., $C_6$-$C_{12}$ aryl groups), substituted aryl groups (e.g., $C_6$-$C_{12}$ substituted aryl groups), heteroaryl groups (e.g., $C_4$-$C_{12}$ heteroaryl groups), substituted heteroaryl groups (e.g., $C_4$-$C_{12}$ substituted heteroaryl groups), halogens, nitro groups, cyano groups, amine groups, hydroxy groups, alkoxy groups (e.g., $C_1$-$C_{10}$ alkoxy groups), aryloxy groups (e.g., $C_6$-$C_{12}$ aryloxy groups), alkenyl groups (e.g., $C_2$-$C_{10}$ alkenyl groups), alkynyl groups (e.g., $C_2$-$C_{10}$ alkynyl groups), alkyl ester groups (e.g., $C_1$-$C_{10}$ alkyl ester groups), and aryl ester groups (e.g., $C_6$-$C_{12}$ aryl ester groups). Further, two adjacent $R_{401}$ groups can be linked to form a fused ring structure, such as a polycyclic aryl group. In the structure of Formula (FX), $R_{410}$ is selected from the group consisting of an oxygen atom, a sulfur atom, and N($R_{415}$). $R_{415}$ is selected from the group consisting of hydrogen, alkyl groups (e.g., $C_1$-$C_{10}$ alkyl groups), substituted alkyl groups (e.g., $C_1$-$C_{10}$ substituted alkyl groups), aryl groups (e.g., $C_6$-$C_{12}$ aryl groups), and substituted aryl groups (e.g., $C_6$-$C_{12}$ substituted aryl groups). $R_{411}$ is selected from the group consisting of C(H), C($R_{112}$), and a nitrogen atom. $R_{412}$ is selected from the group consisting of alkyl groups (e.g., $C_1$-$C_{10}$ alkyl groups), substituted alkyl groups (e.g., $C_1$-$C_{10}$ substituted alkyl groups), aryl groups (e.g., $C_6$-$C_{12}$ aryl groups), substituted aryl groups (e.g., $C_6$-$C_{12}$ substituted aryl groups), heteroaryl groups (e.g., $C_4$-$C_{12}$ heteroaryl groups), substituted heteroaryl groups (e.g., $C_4$-$C_{12}$ substituted heteroaryl groups), halogens, nitro groups, cyano groups, amine groups, hydroxy groups, alkoxy groups (e.g., $C_1$-$C_{10}$ alkoxy groups), aryloxy groups (e.g., $C_6$-$C_{12}$ aryloxy groups), alkenyl groups (e.g., $C_1$-$C_{10}$ alkenyl groups), alkynyl groups (e.g., $C_2$-$C_{10}$ alkynyl groups), alkyl ester groups (e.g., $C_2$-$C_{10}$ alkyl ester groups), and aryl ester groups (e.g., $C_6$-$C_{12}$ aryl ester groups). Further, two adjacent $R_{412}$ groups can be linked to form a fused ring structure, such as a polycyclic aryl group. The variable g is an integer from 0 to 2. In the structure of Formula (FXV), $R_{410}$ and $R_{412}$ are selected from the same groups described above for Formula (FX), and the variable h is an integer from 0 to 3.

In a preferred embodiment, $R_{301}$, $R_{302}$, $R_{303}$, and $R_{304}$ are each hydrogen, and $R_{311}$ and $R_{312}$ are each a phenyl group. In another preferred embodiment, $R_{301}$, $R_{302}$, $R_{303}$, and $R_{304}$ are each hydrogen, and $R_{311}$ and $R_{312}$ are each a 4-chlorophenyl group. In another preferred embodiment, $R_{301}$, $R_{302}$, $R_{303}$, and $R_{304}$ are each hydrogen, and $R_{311}$ and $R_{312}$ are each a 4-fluorophenyl group. In another preferred embodiment, $R_{301}$, $R_{302}$, $R_{303}$, and $R_{304}$ are each hydrogen, $R_{311}$ is a methyl group, and $R_{312}$ is a phenyl. In another preferred embodiment, $R_{301}$, $R_{302}$, $R_{303}$, and $R_{304}$ are each hydrogen, $R_{311}$ is hydrogen, and $R_{312}$ is a 2-thienyl group. In another preferred embodiment, $R_{301}$, $R_{302}$, $R_{303}$, and $R_{304}$ are each hydrogen, $R_{311}$ is hydrogen, and $R_{312}$ is a 3-thienyl group. In another preferred embodiment, $R_{301}$, $R_{302}$, $R_{303}$, and $R_{304}$ are each hydrogen, $R_{311}$ is a methyl group, and $R_{312}$ is a 2-furyl group. In another preferred embodiment, $R_{301}$, $R_{302}$, $R_{303}$, and $R_{304}$ are each hydrogen, $R_{311}$ is hydrogen, and $R_{312}$ is a dimethylamino group. In another preferred embodiment, $R_{301}$, $R_{302}$, $R_{303}$, and $R_{304}$ are each hydrogen, and $R_{311}$ and $R_{312}$ are each $C_1$-$C_8$ alkyl groups, preferably propyl groups. In another preferred embodiment, $R_{301}$, $R_{302}$, $R_{303}$, and $R_{304}$ are each hydrogen, $R_{311}$ is hydrogen, and $R_{312}$ is a 2-phenylethenyl group.

The compatibilizing agent can comprise multiple fulvene moieties. For example, the compatibilizing agent can comprise two fulvene moieties and conform to the structure of Formula (EXX) below:

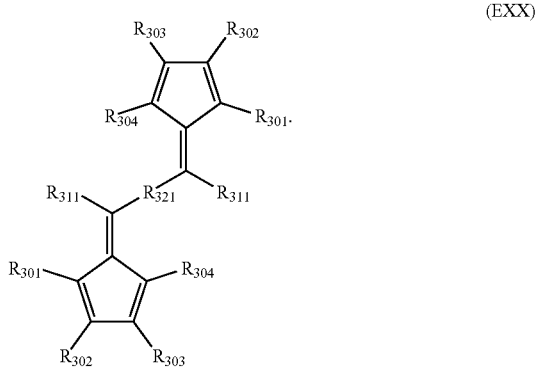

(EXX)

In the structure of Formula (EXX), each $R_{301}$, $R_{302}$, $R_{303}$, and $R_{304}$ is independently selected from the groups recited above in the structure of Formula (EI), each $R_{311}$ is independently selected from the group recited above in the structure of Formula (EX), and $R_{321}$ is selected from the group consisting of alkanediyl groups, substituted alkanediyl groups, arenediyl groups, substituted arenediyl groups, heteroarenediyl groups, and substituted heteroarenediyl groups. In a preferred embodiment, each $R_{301}$, $R_{302}$, $R_{303}$, and $R_{304}$ is hydrogen, each $R_{311}$ is an aromatic group, and $R_{321}$ is an arenediyl group. More specifically, in such a preferred embodiment, each $R_{301}$, $R_{302}$, $R_{303}$, and $R_{304}$ is hydrogen, each $R_{311}$ is a phenyl group, and $R_{321}$ is a phen-1,4-diyl group. In another preferred embodiment, each $R_{301}$, $R_{302}$, $R_{303}$, $R_{304}$, and $R_{311}$ is hydrogen, and $R_{321}$ is an arenediyl group, preferably a phen-1,4-diyl group.

In certain instances, the compatibilizing agent can undergo a dimerization or oligomerization via an auto-Diels-Alder reaction. In such an auto-Diels-Alder reaction, the cyclopentadienyl moiety in one molecule of the compatibilizing agent acts as the diene, and a double bond in the cyclopentadienyl moiety of another molecule of the compatibilizing agent acts as the dienophile. When a fulvene moiety conforming to the structure of Formula (EI) is the dienophile in a Diels-Alder reaction, the fulvene moiety is transformed into a moiety conforming to the structure of Formula (EIII) above. In the structure of Formula (EIII) above, the truncated bonds attached to the adjacent carbon atoms in the ring represent bonds forming part of a cyclic moiety resulting from the reaction with the diene. Thus, in a more specific example of a compatibilizing agent comprising a moiety conforming to the structure of Formula (EIII) above, the compatibilizing agent can comprise a moiety conforming to the structure of Formula (EIIIA) below

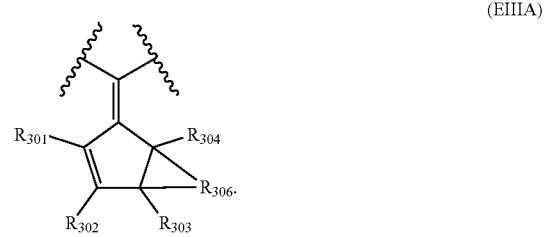

(EIIIA)

In the structure of Formula (EIIIA), $R_{301}$, $R_{302}$, $R_{303}$, and $R_{304}$ are selected from the groups recited above, and $R_{306}$ is a vicinal divalent moiety comprising at least one double bond, such as a divalent cyclic moiety (e.g., a divalent cyclopentenyl moiety). When $R_{306}$ is a divalent cyclic moiety (e.g., a divalent cyclopentenyl moiety), the compatibilizing agent comprises a bicyclic moiety formed by the bonds to adjacent carbon atoms in the cyclic moiety.

The dimer resulting from the auto-Diels-Alder reaction of a compatibilizing agent conforming to the structure of Formula (EX) above will conform to the structure of Formula (EXA) below

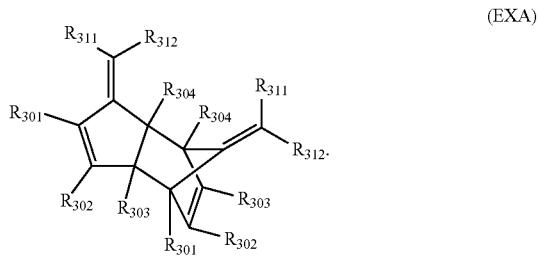

(EXA)

In the structure of Formula (EXA), $R_{301}$, $R_{302}$, $R_{303}$, $R_{304}$, $R_{311}$, and $R_{312}$ are selected from the groups disclosed above for the compound conforming to the structure of Formula (EX). The dimer can be either the endo or exo isomer. Further, a dimer possessing the structure of Formula (EXA) can serve as the dienophile in subsequent Diels-Alder reactions with a diene, with such subsequent reactions yielding a variety of oligomeric species. While not wishing to be bound to any particular theory, it is believed that the dimeric and oligomeric species described above can undergo a retro-Diels-Alder reaction to yield the fulvene-containing compounds from which the dimeric and oligomeric species were originally derived. It is believed that this retro-Diels-Alder reaction can occur when a polymer composition containing the dimeric or oligomeric species is heated during processing, such as the heating that occurs when the polymer composition is extruded.

The compatibilizing agent can have any suitable molar mass. As will be understood by those of ordinary skill in the art, the molar mass of a compound, in combination with other factors, influences the melting point and boiling point of a compound. Thus, compounds with higher molar masses generally have higher melting points and boiling points. While not wishing to be bound to any particular theory, it is believed that the melting point and boiling point of the compatibilizing agent may influence the efficacy of the compatibilizing agent in the compositions of the invention. For example, it is believed that a compatibilizing agent having a relatively low molar mass and low boiling point (e.g., a boiling point that is significantly lower than the temperature at which the polymer composition is extruded) may volatilize to a significant degree during the extrusion process, thereby leaving less compatibilizing agent to modify the properties of the polymer composition. Thus, the compatibilizing agent preferably has a molar mass that is high enough that the compatibilizing agent exhibits a boiling point that is greater than the temperature at which the polymer composition is extruded. In a series of preferred embodiments, the compatibilizing agent preferably has a molar mass of about 130 g/mol or more, about 140 g/mol or more, about 150 g/mol or more, or about 160 g/mol or more. Also, it is believed that a compatibilizing agent having a relatively high melting point (e.g., a melting point that is higher than the temperature at which the polymer composition is extruded) may not disperse well in the molten polymer during the extrusion process, or at least not disperse as well as a compatibilizing agent having a melting point below the extrusion temperature. And poor dispersion of the compatibilizing agent will negatively impact the physical property improvements that can be achieved as compared to a well-dispersed compatibilizing agent. Thus, in a series of preferred embodiments, the compatibilizing has a melting point of about 230° C. or less, about 220° C. or less, about 210° C. or less, or about 200° C. or less.

The concentration of the compatibilizing agent in the composition can be varied to meet the objectives of the end user. For example, the concentration can be varied in order to achieve a desired increase in the MFR of the polymer composition with a minimal decrease (or potentially even an increase) in the strength of the polymer, in particular the impact strength. In a preferred embodiment, the compatibilizing agent can be present in an amount of about 10 ppm or more, about 50 ppm or more, about 100 ppm or more, about 150 ppm or more, or about 200 ppm or more, based on the total weight of the polymer composition. In another preferred embodiment, the compatibilizing agent can be present in an amount of about 5 wt. % (50,000 ppm) or less, about 4 wt. % (40,000 ppm) or less, about 3 wt. % (30,000 ppm) or less, about 2 wt. % (20,000 ppm) or less, about 1 wt. % (10,000 ppm) or less, or about 0.5 wt. % (5,000 ppm) or less, based on the total weight of the polymer composition. Thus, in certain preferred embodiments, the compatibilizing agent can be present in an amount of about 10 to about 50,000 ppm, about 100 to about 10,000 ppm, or about 200 to about 5,000 ppm, based on the total weight of the polymer composition.

When a chemical free radical generator is employed (as discussed below), the concentration of the compatibilizing agent in the polymer composition can additionally or alternatively be expressed in terms of a ratio between the amount of the compatibilizing agent and the amount of the chemical free radical generator. In order to normalize this ratio for differences in the molecular weight of compatibilizing agents and number of peroxide bonds in the chemical free radical generators, the ratio is usual expressed as a ratio of the number of moles of compatibilizing agent present in the composition to the molar equivalents of peroxide bonds (O—O bonds) present from the addition of the chemical free radical generator. Preferably, the ratio (i.e., ratio of moles of compatibilizing agent to molar equivalents of peroxide bonds) is about 1:10 or more, about 1:5 or more, about 3:10 or more, about 2:5 or more, about 1:2 or more, about 3:5 or more, about 7:10 or more, about 4:5 or more, about 9:10 or more, or about 1:1 or more. In another preferred embodiment, the ratio is about 10:1 or less, about 5:1 or less, about 10:3 or less, about 5:2 or less, about 2:1 or less, about 5:3 or less, about 10:7 or less, about 5:4 or less, about 10:9 or less, or about 1:1 or less. Thus, in a series of preferred embodiments, the compatibilizing agent can be present in the composition in a ratio of moles of compatibilizing agent to molar equivalents of peroxide bonds of about 1:10 to about 10:1, about 1:5 to about 5:1, about 1:4 to about 4:1, about 3:10 to about 10:3, about 2:5 to about 5:2, or about 1:2 to about 2:1.

The second step of the method of the invention entails providing a heterophasic polymer composition. The heterophasic polymer composition preferably is a heterophasic polyolefin polymer composition. The subject heterophasic polyolefin polymers that can be advantageously modified according to the method of the invention are characterized by at least two distinct phases: a propylene polymer phase; and an ethylene polymer phase. The propylene polymer phase preferably comprises propylene polymers selected from the group consisting of polypropylene homopolymers and copolymers of propylene and up to 50 wt. % of ethylene and/or $C_4$-$C_{10}$ α-olefins. The ethylene polymer phase preferably comprises ethylene polymers selected from the group consisting of ethylene homopolymers and copolymers of ethylene and $C_3$-$C_{10}$ α-olefins. The ethylene content of the ethylene polymer phase preferably is at least 8 wt. %. When the ethylene phase is a copolymer of ethylene and $C_3$-$C_{10}$ α-olefins, the ethylene content of the ethylene phase can range from 8 to 90 wt. %. In one embodiment, the ethylene content of the ethylene phase preferably is at least 50 wt. %. Either the propylene polymer phase or the ethylene polymer phase can form the continuous phase of the composition and the other will form the discrete or dispersed phase of the composition. For example, the ethylene polymer phase can be the discontinuous phase and the polypropylene polymer phase can be the continuous phase. In one embodiment of the invention, the propylene content of the propylene polymer phase preferably is greater than the propylene content of the ethylene polymer phase.

The relative concentrations of the propylene polymer phase and the ethylene polymer phase in the heterophasic polymer composition can vary over a wide range. By way of example, the ethylene polymer phase can comprise from 5 to 80 wt. % of the total weight of propylene polymers and ethylene polymers in the composition, and the propylene polymer phase can comprise from 20 to 95 wt. % of the total weight of propylene polymers and ethylene polymers in the composition.

In various embodiments of the invention, (i) the ethylene content can range from 5 to 75 wt. %, or even 5 to 60 wt. %, based on the total propylene polymer and ethylene polymer content in the heterophasic composition, (ii) the ethylene polymer phase can be an ethylene-propylene or ethylene-octene elastomer, and/or (iii) the propylene content of the propylene polymer phase can be 80 wt. % or greater.

The method of the invention is particularly useful for modifying polypropylene impact copolymers. Suitable impact copolymers can be characterized by (i) a continuous phase comprising polypropylene polymers selected from the group consisting of polypropylene homopolymers and copolymers of propylene and up to 50 wt. % of ethylene and/or $C_4$-$C_{10}$ α-olefins and (ii) a discontinuous phase comprising elastomeric ethylene polymers selected from the group consisting of copolymers of ethylene and $C_3$-$C_{10}$ α-olefin monomers. Preferably, the ethylene polymers have an ethylene content of from 8 to 90 wt. %.

In various embodiments of the invention directed to propylene impact copolymers, (i) the ethylene content of the discontinuous phase can be from 8 to 80 wt. %, (ii) the ethylene content of the heterophasic composition can be from 5 to 30 wt. %, based on the total propylene polymers and ethylene polymers in the composition; (iii) the propylene content of the continuous phase can be 80 wt. % or greater and/or (iv) the discontinuous phase can be from 5 to 35 wt. % of the total propylene polymers and ethylene polymers in the composition.

Examples of heterophasic polyolefin polymers that can be modified are impact copolymers characterized by a relatively rigid, polypropylene homopolymer matrix (continuous phase) and a finely dispersed phase of ethylene-propylene rubber (EPR) particles. Such polypropylene impact copolymers can be made in a two-stage process, where the polypropylene homopolymer is polymerized first and the ethylene-propylene rubber is polymerized in a second stage. Alternatively, the impact copolymer can be made in three or more stages, as is known in the art. Suitable processes can be found in the following references: U.S. Pat. Nos. 5,639,822 and 7,649,052 B2. Examples of suitable processes to make polypropylene impact copolymers are known in the industry by the commercial names Spheripol®, Unipol®, Mitsui process, Novolen process, Spherizone®, Catalloy®, Chisso process, Innovene®, Borstar®, and Sinopec process. These processes could use heterogeneous or homogeneous Ziegler-Natta or metallocene catalysts to accomplish the polymerization.

The heterophasic polymer composition can be formed by melt mixing two or more polymer compositions, which form at least two distinct phases in the solid state. By way of example, the heterophasic composition can comprise three distinct phases. The heterophasic polymer composition can result from melt mixing two or more types of recycled polymer compositions (e.g., polyolefin polymer compositions). Accordingly, the phrase "providing a heterophasic polymer composition" as used herein includes employing a polymer composition in the process that is already heterophasic, as well as melt mixing two or more polymer compositions during the process, wherein the two or more polymer compositions form a heterophasic system. For example, the heterophasic polymer composition can be made by melt mixing a polypropylene homopolymer and an ethylene/α-olefin copolymer, such as an ethylene/butene elastomer. Examples of suitable ethylene/α-olefin copolymers are commercially available under the names Engage™, Exact®, Vistamaxx®, Versify™, INFUSE™, Nordel™, Vistalon®, Exxelor™, and Affinity™. Furthermore, it can be understood that the miscibility of the polymer components that form the heterophasic polymer composition can vary when the composition is heated above the melting point of the continuous phase in the system, yet the system will form two or more phases when it cools and solidifies. Examples of heterophasic polymer compositions can be found in U.S. Pat. No. 8,207,272 B2 and European Patent No. EP 1 391 482 B1.

Certain characteristics of the bulk heterophasic polymer composition (as measured prior to treatment with the compatibilizing agent) have been found to influence the physical property improvements (e.g., increase in impact strength) realized through the incorporation of the compatibilizing agent. In particular, with respect to the bulk characteristics of the heterophasic polymer composition, the ethylene preferably comprises about 6 wt. % or more, about 7 wt. % or more, about 8 wt. % or more, or about 9 wt. % or more of the total weight of the heterophasic polymer composition. The heterophasic polymer composition preferably contains about 10 wt. % or more, about 12 wt. % or more, about 15 wt. % or more, or about 16 wt. % or more xylene solubles or amorphous content. Further, about 5 mol. % or more, about 7 mol. % or more, about 8 mol. % or more, or about 9 mol. % or more of the ethylene present in the heterophasic polymer composition preferably is present in ethylene triads (i.e., a group of three ethylene monomer units bonded in sequence). Lastly, the number-average sequence length of ethylene runs (ethylene monomer units bonded in sequence) in the heterophasic polymer composition preferably is about 3 or more, about 3.25 or more, about 3.5 or more, about 3.75 or more, or about 4 or more. The mol. % of ethylene in ethylene triads and the number-average sequence length of ethylene runs can both be measured using $^{13}C$ nuclear magnetic resonance (NMR) techniques known in the art. The heterophasic polymer composition can exhibit any one of the characteristics described in this paragraph. Preferably, the heterophasic polymer composition exhibits two or more of the characteristics described in this paragraph. Most preferably, the heterophasic polymer composition exhibits all of the characteristics described in this paragraph.

Certain characteristics of the ethylene phase of the heterophasic polymer composition (as measured prior to treatment with the compatibilizing agent) have also been found to influence the physical property improvements (e.g., increase in impact strength) realized through the incorporation of the compatibilizing agent. The characteristics of the ethylene phase of the composition can be measured using any suitable technique, such as temperature rising elution fractionation (TREF) and $^{13}C$ NMR analysis of the fractions obtained. In a preferred embodiment, about 30 mol. % or more, about 40 mol. % or more, or about 50 mol. % or more of the ethylene present in a 60° C. TREF fraction of the heterophasic polymer composition is present in ethylene triads. In another preferred embodiment, about 30 mol. % or more, about 40 mol. % or more, or about 50 mol. % or more of the ethylene present in an 80° C. TREF fraction of the heterophasic polymer composition is present in ethylene triads. In another preferred embodiment, about 5 mol. % or more, about 10 mol. % or more, about 15 mol. % or more, or about 20 mol. % or more of the ethylene present in a 100° C. TREF fraction of the heterophasic polymer composition is present in ethylene triads. The number-average sequence length of ethylene runs present in a 60° C. TREF fraction of the heterophasic polymer composition preferably is about 3 or more, about 4 or more, about 5 or more, or about 6 or more. The number-average sequence length of ethylene runs present in an 80° C. TREF fraction of the heterophasic polymer composition preferably is about 7 or more, about 8 or more, about 9 or more, or about 10 or more. The number-average sequence length of ethylene runs present in a 100° C. TREF fraction of the heterophasic polymer composition preferably is about 10 or more, about 12 or more, about 15 or more, or about 16 or more. The heterophasic polymer composition can exhibit any one of the TREF fraction characteristics described above or any suitable combination of the TREF fraction characteristics described above. In a preferred embodiment, the heterophasic polymer composition exhibits all of the TREF fraction characteristics described above (i.e., the ethylene triad and number-average sequence length characteristics for the 60° C., 80° C., and 100° C. TREF fractions described above).

Heterophasic polymer compositions exhibiting the characteristics described in the two preceding paragraphs have been observed to respond more favorably to the addition of the compatibilizing agent than heterophasic polymer compositions that do not exhibit these characteristics. In particular, heterophasic polymer compositions exhibiting these characteristics show significant improvements in impact strength when processed according to the method of the invention, whereas heterophasic polymer compositions that do not exhibit these characteristics do not show such marked improvements when processed under the same conditions. This differential response and performance has been observed even when the different polymer compositions have approximately the same total ethylene content (i.e., the percent ethylene in each polymer composition is approximately the same). This result is surprising and was not anticipated.

In one embodiment of the invention, the heterophasic polymer composition does not have any polyolefin constituents with unsaturated bonds. In particular, both the propylene polymers in the propylene phase and the ethylene polymers in the ethylene phase are free of unsaturated bonds.

In another embodiment of the invention, in addition to the propylene polymer and ethylene polymer components, the heterophasic polymer composition can further comprise an elastomer, such as elastomeric ethylene copolymers, elastomeric propylene copolymers, styrene block copolymers, such as styrene-butadiene-styrene (SBS), styrene-ethylene-butylene-styrene (SEBS), styrene-ethylene-propylene-styrene (SEPS) and styrene-isoprene-styrene (SIS), plastomers, ethylene-propylene-diene terpolymers, LLDPE, LDPE, VLDPE, polybutadiene, polyisoprene, natural rubber, and amorphous polyolefins. The rubbers can be virgin or recycled.

The method of the invention preferably utilizes a second polymer composition in addition to the heterophasic polymer composition described above. The second polymer composition preferably contains recycled polymer. Preferably, the second polymer composition contains about 1 wt. % or more recycled polymer. More preferably, the second polymer composition contains about 5 wt. % or more, about 10 wt. % or more, about 15 wt. % or more, about 20 wt. % or more, or about 25 wt. % or more recycled polymer. The recycled polymer present in the second polymer composition can be any suitable polymer or combination of polymers. Typically, the recycled polymer present in the second polymer composition is selected from the group consisting of polyolefins (e.g., polypropylene, polyethylene), polyesters (e.g., polyethylene terephthalate), polystyrene, poly (vinyl chloride), and mixtures thereof. Preferably, the recycled polymer content of the second polymer composition is mainly derived from a polyolefin polymer or combination of polyolefin polymers. In other words, recycled polyolefins preferably account for about 50 wt. % or more (e.g., about 60 wt. % or more, about 70 wt. % or more, about 75 wt. % or more, or about 80 wt. % or more) of the recycled polymer content of the second polymer composition. In a preferred embodiment, the recycled content of the second polymer composition is principally derived from PCR polymer (e.g., more than 50 wt. %, about 60 wt. % or more, about 70 wt. % or more, about 75 wt. % or more, about 80 wt. % or more, about 85 wt. % or more, about 90 wt. % or more, or about 95 wt. % or more of the recycled polymer content is PCR polymer).

In addition to the recycled polymer, the second polymer composition can comprise virgin polymer (i.e., polymer that has not been used by a consumer/end user and then recycled). When present in the second polymer composition, this virgin polymer can be any suitable polymer or combination of polymers. Preferably, the virgin polymer is a polyolefin, such as a polypropylene polymer.

In certain embodiments, the second polymer composition can further comprise one or more fillers. For example, the second polymer composition can comprise talc, calcium carbonate, and mixtures thereof.

As noted above, the method entails the step of mixing the compatibilizing agent, the heterophasic polymer composition, and the second polymer composition. The compatibilizing agent, the heterophasic polymer composition, and the second polymer composition can be mixed using any suitable technique or apparatus. In one embodiment of the invention, the polymer composition is produced by melt mixing the heterophasic polymer composition and second polymer composition with a compatibilizing agent in the presence of free radicals, which have been generated in the composition. The melt mixing step is conducted under conditions such that the composition is heated to above the melting temperature of the major polyolefin component of the mixture (i.e., the mixture of the heterophasic polymer composition and second polymer composition) and mixed while in the molten state. Examples of suitable melt mixing processes include melt compounding, such as in an extruder, injection molding, and mixing in a Banbury mixer or kneader. By way of example, the mixture can be melt mixed at a temperature of from 160° C. to 300° C. In particular, propylene impact copolymers can be melt mixed at a temperature of from 180° C. to 290° C. The heterophasic polymer composition (propylene polymer phase and ethylene polymer phase), second polymer composition, compatibilizing agent and an organic peroxide can be melt compounded in an extruder at a temperature above the melting temperature of all of the polyolefin polymers in the composition (i.e., the mixture of the heterophasic polymer composition and second polymer composition).

In another embodiment of the invention, the heterophasic polymer composition and second polymer composition can be dissolved in a solvent, the compatibilizing agent can be added to the resulting polymer solution, and the free radicals can be generated in the solution. In another embodiment of the invention, the compatibilizing agent can be combined with the heterophasic polymer composition and the second polymer composition in the solid state and free radicals can be generated during solid-state shear pulverization as described in Macromolecules, "Ester Functionalization of Polypropylene via Controlled Decomposition of Benzoyl Peroxide during Solid-State Shear Pulverization"—vol. 46, pp. 7834-7844 (2013).

Conventional processing equipment may be used to mix the heterophasic polymer composition (e.g., propylene polymers and ethylene polymers) and compatibilizing agent together in a single step, in the presence of free radicals that are either added to the mixture, such as an organic peroxide, or generated in-situ, such as by shear, UV light, etc. Nevertheless, it is also possible to mix various combinations of the components in multiple steps and in various sequences, and subsequently subject the mixture to conditions whereby the compatibilizing agent reacts with the polyolefin polymers, as described herein.

For example, the compatibilizing agent and/or the free radical generator (when a chemical compound is used) can be added to the polymer in the form of one or masterbatch compositions. Suitable masterbatch compositions can comprise the compatibilizing agent and/or the free radical generator in a carrier resin. The compatibilizing agent and/or the free radical generator can be present in the masterbatch composition in an amount of about 1 wt. % to about 80 wt. % based on the total weight of the composition. Any suitable carrier resin can be used in the masterbatch compositions, such as any suitable thermoplastic polymer. For example, the carrier resin for the masterbatch compositions can be a polyolefin polymer, such as a polypropylene impact copolymer, a polyolefin copolymer, an ethylene/α-olefin copolymer, a polyethylene homopolymer, a linear low density polyethylene polymer, a polyolefin wax, or mixtures of such polymers. The carrier resin can also be a propylene polymer or an ethylene polymer that is the same as or similar to the propylene polymer or ethylene polymer present in the heterophasic polyolefin polymer composition. Such a masterbatch composition would allow the end user to manipulate the ratio of propylene polymer(s) to ethylene polymer(s) present in the heterophasic polymer composition. This may be preferred when the end user needs to modify the propylene to ethylene ratio of a commercial resin grade in order to achieve the desired set of properties (e.g., balance of impact and stiffness).

The method further comprises the step of generating free radicals in the resulting mixture of the compatibilizing agent, the heterophasic polymer composition, and the second polymer composition. More specifically, this step involves generating free radicals in the propylene polymer phase and the ethylene polymer phase of the heterophasic polymer composition and in the polymer of the second polymer composition. The free radicals can be generated in the heterophasic polymer composition and the second polymer composition by any suitable means.

A free radical generator is employed in the present invention to cause polymer chain scission and thereby positively affect (i.e., increase) the MFR of the polymer composition, while generating sufficient free radicals to foster the reaction of the compatibilizing agent with the free radicals generated in the polymers (e.g., the propylene and ethylene polymers in the heterophasic polymer composition and the polymers in the second polymer composition). The free radical generator can be a chemical compound, such as an organic peroxide or a bis-azo compound, or free radicals may be generated by subjecting the mixture of compatibilizing agent, heterophasic polymer composition, and second polymer composition to ultrasound, shear, an electron beam (for example β-rays), light (for example UV light), heat and radiation (for example γ-rays and X-rays), or combinations of the foregoing.

Organic peroxides having one or more O—O functionalities are of particular utility as the free radical generator in the method of the present invention. Examples of such organic peroxides include: 2,5-dimethyl-2,5-di(t-butylperoxy)hexane, 2,5-dimethyl-2,5-di(t-butyl peroxy)hexyne-3,3, 6,6,9,9-pentamethyl-3-(ethyl acetate)-1,2,4,5-tetraoxy cyclononane, t-butyl hydroperoxide, hydrogen peroxide, dicumyl peroxide, t-butyl peroxy isopropyl carbonate, di-t-butyl peroxide, p-chlorobenzoyl peroxide, dibenzoyl diperoxide, t-butyl cumyl peroxide; t-butyl hydroxyethyl peroxide, di-t-amyl peroxide and 2,5-dimethylhexene-2,5-diperisononanoate, acetylcyclohexanesulphonyl peroxide, diisopropyl peroxydicarbonate, tert-amyl perneodecanoate, tert-butyl-perneodecanoate, tert-butylperpivalate, tert-amylperpivalate, bis(2,4-dichlorobenzoyl)peroxide, diisononanoyl peroxide, didecanoyl peroxide, dioctanoyl peroxide, dilauroyl peroxide, bis(2-methylbenzoyl)peroxide, disuccinoyl peroxide, diacetyl peroxide, dibenzoyl peroxide, tert-butyl per-2-ethylhexanoate, bis(4-chlorobenzoyl)peroxide, tert-butyl perisobutyrate, tert-butyl permaleate, 1,1-bis(tert-butylperoxy)-3,5,5-trimethylcyclo-hexane, 1,1-bis(tert-butylperoxy)cyclohexane, tert-butyl peroxyisopropyl carbonate, tert-butyl perisononaoate, 2,5-dimethylhexane 2,5-dibenzoate, tert-butyl peracetate, tert-amyl perbenzoate, tert-butyl perbenzoate, 2,2-bis(tert-butyl peroxy)butane, 2,2-bis(tert-butylperoxy)propane, dicumyl peroxide, 2,5-dimethylhexane 2,5-di-tert-butylperoxid, 3-tert-butylperoxy-3-phenyl phthalide, di-tert-amyl peroxide, α,α'-bis(tert-butylperoxyisopropyl)benzene, 3,5-bis(tert-butylperoxy)-3,5-dimethyl-1,2-dioxolane, di-tert-butyl peroxide, 2,5-dimethylhexyne 2,5-di-tert-butyl peroxide, 3,3,6,6,9,9-hexamethyl-1,2,4,5-tetraoxacyclononane, p-menthane hydroperoxide, pinane hydroperoxide, diisopropylbenzene mono-α-hydroperoxide, cumene hydroperoxide or tert-butyl hydroperoxide.

The organic peroxide can be present in the composition (i.e., the mixture of the compatibilizing agent, the heterophasic polymer composition, and the second polymer composition) in any suitable amount. The suitable amount of organic peroxide will depend upon several factors, such as the particular polymers that are used in the composition, the starting MFR of the heterophasic polymer composition and/or the second polymer composition, and the desired MFR of the final polymer composition. In a preferred embodiment, the organic peroxide can be present in the polymer composition in an amount of about 10 ppm or more, about 50 ppm or more, or about 100 ppm or more, based on the total weight of the polymer composition. In another preferred embodiment, the organic peroxide can be present in the polymer composition in an amount of about 2 wt. % (20,000 ppm) or less, about 1 wt. % (10,000 ppm) or less, about 0.5 wt. % (5,000 ppm) or less, about 0.4 wt. % (4,000 ppm) or less, about 0.3 wt. % (3,000 ppm) or less, about 0.2 wt. % (2,000 ppm) or less, or about 0.1 wt. % (1,000 ppm) or less, based on the total weight of the polymer composition. Thus, in a series of preferred embodiments, the organic peroxide can be present in the polymer composition in an amount of about 10 to about 20,000 ppm, about 50 to about 5,000 ppm, about 100 to about 2,000 ppm, or about 100 to about 1,000 ppm, based on the total weight of the polymer composition. The amount of organic peroxide can also be expressed in terms of a molar ratio of the compatibilizing agent and peroxide bonds, as is described above. It will be understood that the amounts of peroxide provided above and elsewhere in the application refer to the initial amount of peroxide present in the composition (i.e., the mixture of the compatibilizing agent, the heterophasic polymer composition, and the second polymer composition) prior to the generation of free radicals As will be understood by those familiar with the art, peroxide is consumed to produce the free radicals and, therefore, the final polymer composition (after free radicals are produced) contains very little, if any, residual peroxide.

Suitable bis azo compounds may also be employed as a source of free radicals. Such azo compounds include, for example, 2,2'-azobisisobutyronitrile, 2,2'-azobis(2-methylbutyronitrile), 2,2'-azobis(2,4-dimethylvaleronitrile), 2,2'- azobis(4-methoxy-2,4-dimethylvaleronitrile), 1,1'-azobis(1-cyclohexanecarbonitrile), 2,2'-azobis(isobutyramide)dihydrate, 2-phenylazo-2,4-dimethyl-4-methoxyvaleronitrile, dimethyl 2,2'-azobisisobutyrate, 2-(carbamoylazo)isobutyronitrile, 2,2'-azobis(2,4,4-trimethylpentane), 2,2'-azobis(2-methyl-propane), 2,2'-azobis(N,N'-dimethyleneisobutyramidine) as free base or hydrochloride, 2,2'-azobis(2-amidinopropane) as free base or hydrochloride, 2,2'-azobis{2-methyl-N-[1,1-bis(hydroxymethyl)ethyl]propionamide}, and 2,2'-azobis{2-methyl-N-[1,1-bis(hydroxymethyl)-2-hydroxyethyl]propionamide}.

Other chemical compounds useful as free radical generators include 2,3-dimethyl-2,3-diphenylbutane and sterically hindered hydroxylamine ester. The various free radical generators described above may be employed alone or in combination.

As is generally described above, at least a portion of the free radicals generated in the polymers (the propylene polymer phase and the ethylene polymer phase of the heterophasic polymer composition and the polymers in the second polymer composition) react with the reactive functional groups present on the compatibilizing agent. Specifically, the free radicals and the reactive functional groups react in a radical addition reaction thereby bonding the compatibilizing agent to the polymer. For example, when the compatibilizing agent reacts with a free radical in the propylene polymer phase and a free radical in the ethylene polymer phase, the compatibilizing agent then provides a link or bridge between the two phases. Further, when the compatibilizing agent reacts with a free radical in the heterophasic polymer composition (in the ethylene polymer phase or the propylene polymer phase) and a free radical in a polymer of the second polymer composition, the compatibilizing agent provides a link or bridge between these two polymers. While not wishing to be bound to any particular theory, it is believed that such links or bridges between the polymers of the composition are responsible for the increase in strength observed in polymer compositions that have been modified according to the method of the invention.

The polymer composition of the present invention is compatible with various types of additives conventionally used in thermoplastic compositions, including stabilizers, UV absorbers, hindered-amine light stabilizers (HALS), antioxidants, flame retardants, acid neutralizers, slip agents, antiblocking agents, antistatic agents, antiscratch agents, processing aids, blowing agents, colorants, opacifiers, carbon fibers, clarifiers, and/or nucleating agents. By way of further example, the composition can comprise fillers, such as calcium carbonate, talc, glass fibers, glass spheres, magnesium oxysulfate whiskers, calcium sulfate whiskers, calcium carbonate whiskers, mica, wollastonite, clays, such as montmorillonite, and bio-sourced or natural filler. The additives can comprise up to 75 wt. % of the total components in the modified heterophasic polymer composition.

The polymer composition of the present invention can be used in conventional polymer processing applications, including but not limited to injection molding, thin-wall injection molding, single-screw compounding, twin-screw compounding, Banbury mixing, co-kneader mixing, two-roll milling, sheet extrusion, fiber extrusion, film extrusion, pipe extrusion, profile extrusion, extrusion coating, extrusion blow molding, injection blow molding, injection stretch blow molding, compression molding, extrusion compression molding, compression blow forming, compression stretch blow forming, thermoforming, and rotomolding. Articles made using the heterophasic polymer composition of the invention can be comprised of multiple layers, with one or any suitable number of the multiple layers containing a heterophasic polymer composition of the invention. By way of example, typical end-use products include containers, packaging, automotive parts, bottles, expanded or foamed articles, appliance parts, closures, cups, furniture, housewares, battery cases, crates, pallets, films, sheet, fibers, pipe, and rotationally molded parts.

The following examples further illustrate the subject matter described above but, of course, should not be construed as in any way limiting the scope thereof. The following methods, unless noted, were used to determine the properties described in the following examples.

Each of the compositions was compounded by blending the components in a closed container for approximately one minute. The compositions were then melt compounded on a Prism TSE-16-TC co-rotating, fully intermeshing, parallel, twin-screw extruder with a 16 mm screw diameter and a length/diameter ratio of 25:1. The barrel temperature of the extruder was ramped from approximately 195° C. to approximately 215° C., and the screw speed was set at approximately 500 rpm. The extrudate (in the form of a strand) for each polypropylene copolymer composition was cooled in a water bath and subsequently pelletized.

The pelletized compositions were then used to form bars by injection molding the compositions on a Nissei HM7 7 ton injection molder having a 14 mm diameter screw. The barrel temperature of the injection molder was approximately 215 to 230° C., and the mold temperature was approximately 25° C. The resulting bars measured approximately 80 mm long, approximately 10 mm wide, and approximately 4.0 mm thick.

The melt flow rate (MFR) was determined on the pelletized compositions according to (ASTM D1238) at 230° C. with a load of 2.16 kg for polypropylene.

The notched Izod impact strength for the bars was measured according to ISO method 180/A. The notched Izod impact strength was measured at +23° C. on bars that had been conditioned at either +23° C. or −30° C. The flexural modulus, reported as chord modulus, for the bars was measured according to ISO method 178.

Xylene solubles were determined by a modified version of ASTM D5492-10 and are a measure of the amount of rubber present in the heterophasic polypropylene copolymers. Approximately 0.6 g of polymer was weighed out and placed into a round-bottom flask along with a stir bar. 50 mL of xylene was added to the polymer in the flask. The polymer xylene mixture was heated to reflux temperature while vigorously stirring. Once the reflux temperature was reached, the solution was stirred for an additional 30 min then cooled to room temperature. The resulting polymer/xylene mixture was gently stirred to break up any precipitated polymer gel then poured through a No. 4 filter paper, both the filtrate containing the soluble fraction and the insoluble fraction were collected. A 10 mL aliquot of the filtrate was taken with a Class A pipet and transferred into a weighed pan. The pan containing the filtrate was then placed on a temperature-controlled hot plate maintaining a temperature of 155° C. to evaporate the xylene. Once most of the xylene was evaporated, the pan was transferred to a vacuum oven set at a temperature of 80±10° C. The pressure was reduced to less than 13.3 kPa and the sample was dried for approximately 2 hours or until a constant weight was achieved. The pan mass was then subtracted giving the mass of the residual soluble polymer. The percentage of soluble polymer in the original sample was calculated using the following equation:

$$S_s = ((V_{bo}/V_{b1} * (W_2 - W_1))/W_0) * 100.$$

In the equation, $S_s$ is the soluble fraction of sample expressed as a percentage; $V_{bo}$ is the original volume of solvent in milliliters; $V_{b1}$ is the volume of the aliquot used for soluble determination in milliliters; $W_2$ is the mass of pan and soluble in grams; $W_1$ is the mass of pan in grams; and $W_o$ is the mass of the original sample in grams.

Example 1

This example demonstrates the production of several polymer compositions according to the invention and the enhanced physical properties exhibited by these polymer compositions.

A total of eight polymer compositions (Samples 1A-1C and Comparative Samples 1A-1E) were produced using a heterophasic polymer composition, a second polymer composition containing post-consumer recycled polymer, a peroxide, and a compatibilizing agent. In particular, the heterophasic polymer composition was a polypropylene impact copolymer, namely Pro-Fax SG702 from LyondellBasell, which contained approximately 19% xylene solubles. The second polymer composition was a post-consumer recycled polypropylene available from Entropex LLC of Sarnia, Ontario, Canada. The peroxide was Varox DBPH available from Vanderbilt Chemicals, LLC. The compatibilizing agent was diphenylfulvene. The loading of the second polymer composition, peroxide, and compatibilizing agent in each polymer composition is set forth in Table 1 below. For each polymer composition, the polypropylene impact copolymer provided the balance of the polymer composition.

TABLE 1

Composition for Samples 1A-1C and Comparative Samples 1A-1E (C.S. 1A-1E).

| Sample | Second Polymer Composition (wt. %) | Peroxide Loading (ppm) | Compatibilizing Agent Loading (ppm) |
|---|---|---|---|
| C.S. 1A | 0 | 0 | 0 |
| C.S. 1B | 0 | 500 | 0 |
| C.S. 1C | 10 | 500 | 0 |
| 1A | 10 | 500 | 800 |
| C.S. 1D | 20 | 500 | 0 |
| 1B | 20 | 500 | 800 |
| C.S. 1E | 40 | 500 | 0 |
| 1C | 40 | 500 | 800 |
| C.S. 1F | 50 | 0 | 0 |
| 1D | 50 | 500 | 800 |
| C.S. 1G | 60 | 0 | 0 |
| 1E | 60 | 500 | 800 |

The components for each polymer composition were mixed and extruded into pellets as described above, and a portion of the pellets for each composition were injection molded into bars according to the general procedure described above. The extruded pellets were used to determine the melt flow rate (MFR) exhibited by the polymer composition, and the injection molded bars were tested to determine flexural modulus and Izod impact strength as described above. The results of this testing are set forth in Table 2 below.

TABLE 2

Test results for Samples 1A-1C and Comparative Samples 1A-1E (C.S. 1A-1E).

| Sample | MFR (g/10 min) | Chord Modulus (MPa) | Izod Impact 23° C. (kJ/m$^2$) | Failure Mode |
|---|---|---|---|---|
| C.S. 1A | 17 | 953 | 15 | Complete |
| C.S. 1B | 48 | 775 | 12 | Complete |
| C.S. 1C | 53 | 792 | 10 | Complete |
| 1A | 27 | 807 | 43 | Partial |
| C.S. 1D | 48 | 813 | 11 | Complete |
| 1B | 26 | 778 | 43 | Partial |
| C.S. 1E | 43 | 816 | 10 | Complete |
| 1C | 24 | 832 | 42 | Partial |
| C.S. 1F | 16 | 881 | 14 | Complete |
| 1D | 26 | 847 | 26 | Partial |
| C.S. 1G | 16 | 892 | 12 | Complete |
| 1E | 27 | 851 | 18 | 7 Complete 3 Partial |

As can be seen from the data in Tables 1 and 2, the polymer compositions containing PCR resin (i.e., the second polymer composition) and no compatibilizing agent generally exhibit diminished flexural properties (lower chord modulus) and impact resistance (lower Izod impact) relative to the virgin polypropylene impact copolymer (C.S. 1A). By way of contrast, those polymer compositions containing a compatibilizing agent (i.e., Samples 1A, 1B, 1C, 1D, and 1E) all exhibited an increase in Izod impact strength relative to the virgin polypropylene impact copolymer (C.S. 1A). Indeed, the Izod impact strength of Samples 1A, 1B, and 1C was nearly three times that of the virgin polypropylene impact copolymer. Further, these improvements in Izod impact strength were accomplished while also dramatically increasing the melt flow rate of the polymer composition, which should translate into processing benefits during manufacture.

Example 2

This example demonstrates the production of several polymer compositions according to the invention and the enhanced physical properties exhibited by these polymer compositions.

A total of nine polymer compositions (Samples 2A-2F and Comparative Samples 2A-2C) were produced using various combinations of a heterophasic polymer composition, a second polymer composition containing post-consumer recycled polymer, a peroxide, and a compatibilizing agent. In particular, the heterophasic polymer composition was a polypropylene impact copolymer, namely Pro-Fax SG702 from LyondellBasell, which contained approximately 19% xylene solubles. The second polymer composition was a post-consumer recycled polypropylene available from Entropex LLC of Sarnia, Ontario, Canada. The peroxide was Varox DBPH available from Vanderbilt Chemicals, LLC. The compatibilizing agent used in each polymer composition is listed in Table 3 below. The loading of the second polymer composition, peroxide, and compatibilizing agent in each polymer composition is set forth in Table 4 below. For each polymer composition, the polypropylene impact copolymer provided the balance of the polymer composition.

TABLE 3

Compatibilizing Agents for Samples 2A-2F and Comparative Samples 2A-2C (C.S. 2A-2C).

| Sample | Compatibilizing Agent chemical name and structure |
|---|---|
| 2A | 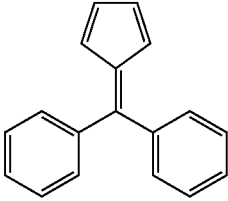<br>Diphenylfulvene |
| 2B | 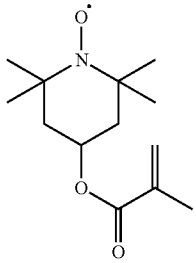<br>Tempo Methacrylate |
| 2C | 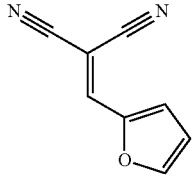<br>(2-Furylmethylene)malononitrile |
| 2D | 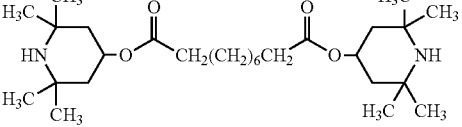<br>Bis(2,2,6,6-tetramethyl-4-piperidyl) sebacate |
| 2E | 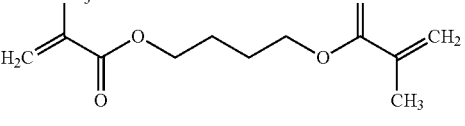<br>1,4-Butanediol dimethacrylate |
| 2F | 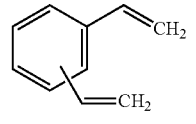<br>Divinylbenzene |
| C.S. 2A | None |
| C.S. 2B | None |
| C.S. 2C | None |

TABLE 4

Composition for Samples 2A-2F and Comparative Samples 2A-2C (C.S. 2A-2C).

| Sample | Second Polymer Composition (wt. %) | Peroxide Loading (ppm) | Compatibilizing Agent Loading (ppm) |
|---|---|---|---|
| C.S. 2A | 0 | 0 | 0 |
| C.S. 2B | 20 | 0 | 0 |
| C.S. 2C | 20 | 500 | 0 |
| 2A | 20 | 500 | 792 |
| 2B | 20 | 500 | 826 |
| 2C | 20 | 500 | 496 |
| 2D | 20 | 500 | 1758 |
| 2E | 20 | 500 | 778 |
| 2F | 20 | 500 | 448 |

The components for each polymer composition were mixed and extruded into pellets as described above, and a portion of the pellets for each composition were injection molded into bars according to the general procedure described above. The extruded pellets were used to determine the melt flow rate (MFR) exhibited by the polymer composition, and the injection molded bars were tested to determine flexural modulus and Izod impact strength as described above. The results of this testing are set forth in Table 5 below.

TABLE 5

Test results for Samples 2A-2F and Comparative Samples 2A-2C (C.S. 2A-2C).

| Sample | MFR (g/10 min) | Chord Modulus (MPa) | Izod impact 23° C. (kJ/m$^2$) | Failure Mode |
|---|---|---|---|---|
| C.S. 2A | 17 | 747 | 41 | Partial |
| C.S. 2B | 17 | 827 | 39 | Partial |
| C.S. 2C | 48 | 800 | 10 | Complete |
| 2A | 26 | 765 | 41 | Partial |
| 2B | 23 | 807 | 40 | Partial |
| 2C | 30 | 807 | 40 | Partial |
| 2D | 18 | 825 | 43 | Partial |
| 2E | 36 | 793 | 16 | Complete |
| 2F | 35 | 789 | 21 | Partial |

The data in Tables 4 and 5 show that polymer compositions produced according to the method of the invention (Samples 2A, 2B, 2C, 2D, 2E, and 2F) exhibited increased Izod impact relative to a similar polymer composition produced without a compatibilizing agent (C.S. 2C). Indeed, Samples 2A, 2B, 2C, and 2D each exhibited Izod impact strengths that were essentially the same as the virgin polypropylene impact copolymer (C.S. 2A), which is surprising given that the polymer compositions all contain 20 wt. % of a polymer composition containing PCR polymer. Further, all of Samples 2A, 2B, 2C, 2D, 2E, and 2F exhibited an increase in the chord modulus relative to the virgin polypropylene impact copolymer. Again, these improvements in flexural properties and impact resistance were achieved while increasing the melt flow rate of the polymer composition relative to the virgin polypropylene impact copolymer. Lastly, the data in the tables show that these improvements can be obtained using a variety of different compatibilizing agents.

Example 3

This example demonstrates the production of several polymer compositions according to the invention and the enhanced physical properties exhibited by these polymer compositions.

A total of seven polymer compositions (Samples 3A-3C and Comparative Samples 3A-3D) were produced using various combinations of a heterophasic polymer composition, a second polymer composition containing post-consumer recycled polymer, a peroxide, and a compatibilizing agent. In particular, the heterophasic polymer composition was a polypropylene impact copolymer, namely PP7414 from ExxonMobil, which contained approximately 20% xylene solubles. The second polymer composition was a post-consumer recycled polypropylene available from Entropex LLC of Sarnia, Ontario, Canada. The peroxide was Varox DBPH available from Vanderbilt Chemicals, LLC. The compatibilizing agent was diphenylfulvene. The loading of the second polymer composition, peroxide, and compatibilizing agent in each polymer composition is set forth in Table 6 below. For each polymer composition, the polypropylene impact copolymer provided the balance of the polymer composition.

TABLE 6

Composition for Samples 3A-3C and Comparative Samples 3A-3D (C.S. 3A-3D).

| Sample | Second Polymer Composition Loading (wt. %) | Peroxide Loading (ppm) | Compatibilizing Agent Loading (ppm) |
|---|---|---|---|
| C.S. 3A | 0 | 0 | 0 |
| C.S. 3B | 10 | 0 | 0 |
| 3A | 10 | 500 | 800 |
| C.S. 3C | 20 | 0 | 0 |
| 3B | 20 | 500 | 800 |
| C.S. 3D | 40 | 0 | 0 |
| 3C | 40 | 500 | 800 |

The components for each polymer composition were mixed and extruded into pellets as described above, and a portion of the pellets for each composition were injection molded into bars according to the general procedure described above. The extruded pellets were used to determine the melt flow rate (MFR) exhibited by the polymer composition, and the injection molded bars were tested to determine flexural modulus and Izod impact strength as described above. The results of this testing are set forth in Table 7 below.

TABLE 7

Test results for Samples 3A-3C and Comparative Samples 3A-3D (C.S. 3A-3D).

| Sample | MFR (g/10 min) | Chord Modulus (MPa) | Izod impact 23° C. (kJ/m$^2$) |
|---|---|---|---|
| C.S. 3A | 24 | 872 | 11 |
| C.S. 3B | 22 | 913 | 11 |
| 3A | 34 | 882 | 14 |
| C.S. 3C | 21 | 922 | 11 |
| 3B | 30 | 853 | 13 |
| C.S. 3D | 18 | 913 | 10 |
| 3C | 29 | 850 | 13 |

The data in Tables 6 and 7 show that polymer compositions produced according to the method of the invention (Samples 3A, 3B, and 3C) exhibited increases in Izod impact strength relative to the virgin polypropylene impact copolymer (C.S. 3A). Further, these increases in Izod impact strength were accomplished while also appreciably increasing the melt flow rate of the polymer composition relative to the virgin polypropylene impact copolymer and the mixture of the polypropylene impact copolymer and second polymer composition (C.S. 3B).

Example 4

This example demonstrates the production of several polymer compositions according to the invention and the enhanced physical properties exhibited by these polymer compositions.

A total of nine polymer compositions (Samples 4A-4C and Comparative Samples 4A-4F) were produced using various combinations of a heterophasic polymer composition, a second polymer composition containing post-consumer recycled polymer, a peroxide, and a compatibilizing agent. In particular, the heterophasic polymer composition was a polypropylene impact copolymer, namely Pro-Fax SG702 from LyondellBasell, which contained approximately 19% xylene solubles. The second polymer composition was a post-consumer recycled polypropylene available, namely KW 621 from KW Plastics of Troy, Ala. The peroxide was Varox DBPH available from Vanderbilt Chemicals, LLC. The compatibilizing agent was diphenylfulvene. The loading of the second polymer composition, peroxide, and compatibilizing agent in each polymer composition is set forth in Table 8 below. For each polymer composition, the polypropylene impact copolymer provided the balance of the polymer composition.

TABLE 8

Composition for Samples 4A-4C and Comparative Samples 4A-4G (C.S. 4A-4G).

| Sample | Second Polymer Composition Loading (wt. %) | Peroxide Loading (ppm) | Additive Loading (ppm) |
|---|---|---|---|
| C.S. 4A | 30 | 0 | 0 |
| C.S. 4B | 30 | 500 | 0 |
| 4A | 30 | 500 | 800 |
| C.S. 4D | 40 | 0 | 0 |
| C.S. 4E | 40 | 500 | 0 |
| 4B | 40 | 500 | 800 |
| C.S. 4F | 50 | 0 | 0 |
| C.S. 4G | 50 | 500 | 0 |
| 4C | 50 | 500 | 800 |

The components for each polymer composition were mixed and extruded into pellets as described above, and a portion of the pellets for each composition were injection molded into bars according to the general procedure described above. The extruded pellets were used to determine the melt flow rate (MFR) exhibited by the polymer composition, and the injection molded bars were tested to determine flexural modulus and Izod impact strength as described above. The results of this testing are set forth in Table 9 below.

TABLE 9

Test results for Samples 4A-4C and Comparative Samples 4A-4F (C.S. 4A-4F).

| Sample | MFR (g/10 min) | Chord Modulus (MPa) | Izod impact 23° C. (kJ/m$^2$) |
|---|---|---|---|
| C.S. 4A | 15 | 942 | 12 |
| C.S. 4B | 47 | 910 | 9 |
| 4A | 25 | 901 | 17 |

TABLE 9-continued

Test results for Samples 4A-4C and Comparative Samples 4A-4F (C.S. 4A-4F).

| Sample | MFR (g/10 min) | Chord Modulus (MPa) | Izod impact 23° C. (kJ/m$^2$) |
|---|---|---|---|
| C.S. 4C | 14 | 994 | 10 |
| C.S. 4D | 46 | 948 | 9 |
| 4B | 26 | 935 | 12 |
| C.S. 4E | 14 | 1018 | 9 |
| C.S. 4F | 44 | 996 | 8 |
| 4C | 25 | 991 | 11 |

The data in Tables 8 and 9 show that polymer compositions produced according to the method of the invention (Samples 4A, 4B, and 4C) exhibited a desirable combination of high melt flow rate and relatively high impact resistance. The data also show increases in Izod impact strength relative to the virgin polypropylene impact copolymer (C.S. 3A). Indeed, these desirable characteristics were achieved even with progressively increasing amounts of the PCR-containing polymer composition (i.e., the second polymer composition), reaching as high as 50% of the second polymer composition. These data suggest that the method of the invention can be used to produce polymer compositions containing appreciable amounts of PCR polymer without deleteriously affecting—and often improving—physical properties of the polymer composition as compared relative to the polypropylene impact copolymer.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

What is claimed is:

1. A method for producing a polymer composition, the method comprising the steps of:
   (a) providing a compatibilizing agent, the compatibilizing agent comprising two or more functional groups capable of reacting with a free radical in a radical addition reaction, wherein the compatibilizing agent is a compound conforming to the structure of Formula (EX)

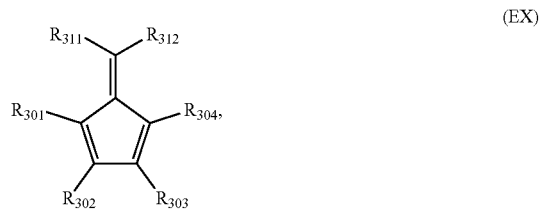

wherein $R_{301}$, $R_{302}$, $R_{303}$, and $R_{304}$ are independently selected from the group consisting of hydrogen, halogens, alkyl groups, substituted alkyl groups, aryl groups, substituted aryl groups, heteroaryl groups, and substituted heteroaryl groups; $R_{311}$ and $R_{312}$ are individual substituents independently selected from the group consisting of hydrogen, alkyl groups, substituted alkyl groups, alkenyl groups, substituted alkenyl groups, amine groups, substituted amine groups, aryl groups, substituted aryl groups, heteroaryl groups, and substituted heteroaryl groups or $R_{311}$ and $R_{312}$ together form a single substituent selected from the group consisting of aryl groups, substituted aryl groups, heteroaryl groups, and substituted heteroaryl groups;
   (b) providing a heterophasic polymer composition, the heterophasic polymer composition comprising a propylene polymer phase and an ethylene polymer phase;
   (c) providing a second polymer composition, the second polymer composition comprising recycled polymer;
   (d) mixing the compatibilizing agent, the heterophasic polymer composition, and the second polymer composition; and
   (e) generating free radicals in the propylene polymer phase and the ethylene polymer phase of the heterophasic polymer composition and in the polymer of the second polymer composition, whereby at least a portion of the compatibilizing agent reacts with the free radicals.

2. The method of claim 1, wherein the compatibilizing agent is present in the mixture of the compatibilizing agent, the heterophasic polymer composition, and the second polymer composition in an amount of 200 ppm to about 5,000 ppm.

3. The method of claim 1, wherein the compatibilizing agent has a melting point of about 230° C. or less.

4. The method of claim 1, wherein heterophasic polymer composition is a polypropylene impact copolymer.

5. The method of claim 4, wherein the polypropylene impact copolymer comprises (i) a continuous phase comprising polypropylene polymers selected from the group consisting of polypropylene homopolymers and copolymers of propylene and up to 50 wt. % of ethylene and/or $C_4$-$C_{10}$ α-olefins and (ii) a discontinuous phase comprising elastomeric ethylene polymers selected from the group consisting of copolymers of ethylene and $C_3$-$C_{10}$ α-olefin monomers.

6. The method of claim 5, wherein the ethylene content of the discontinuous phase is from about 8 wt. % to about 80 wt. %.

7. The method of claim 5, wherein the ethylene content of the heterophasic composition is from about 5 wt. % to about 30 wt. %, based on the total propylene polymers and ethylene polymers in the composition.

8. The method of claim 5, wherein the propylene content of the continuous phase is about 80 wt. % or more.

9. The method of claim 5, wherein the discontinuous phase is from about 5 wt. % to about 35 wt. % of the total propylene polymers and ethylene polymers in the composition.

10. The method of claim 1, wherein the second polymer composition comprises about 5 wt. % or more recycled polymer.

11. The method of claim 10, wherein the second polymer composition comprises about 15 wt. % or more recycled polymer.

12. The method of claim 1, wherein the free radicals are generated in step (e) by the addition of an organic peroxide.

13. The method of claim 12, wherein the organic peroxide is present in the mixture of the compatibilizing agent, the heterophasic polymer composition, and the second polymer composition in an amount of about 100 ppm to about 2,000 ppm.

14. The method of claim 12, wherein the compatibilizing agent is present in the composition in a ratio of moles of compatibilizing agent to molar equivalents of peroxide bonds of about 1:10 to about 10:1.

* * * * *